United States Patent
Tyler et al.

(10) Patent No.: US 12,015,303 B2
(45) Date of Patent: Jun. 18, 2024

(54) SYSTEMS, APPARATUS, AND METHODS FOR UTILIZING SOLAR ENERGY AND OTHER TYPES OF RENEWABLE ENERGY

(71) Applicant: Jonathan A. Tyler, Ashuelot, NH (US)

(72) Inventors: Jonathan A. Tyler, Ashuelot, NH (US); Kenneth Allan Tarlow, San Rafael, CA (US)

(73) Assignee: Jonathan A. Tyler, Ashuelot, NH (US)

( * ) Notice: Subject to any disclaimer, the term of this patent is extended or adjusted under 35 U.S.C. 154(b) by 0 days.

(21) Appl. No.: 18/310,726

(22) Filed: May 2, 2023

(65) Prior Publication Data

US 2023/0361594 A1     Nov. 9, 2023

Related U.S. Application Data

(60) Provisional application No. 63/337,711, filed on May 3, 2022, provisional application No. 63/381,088, filed on Oct. 26, 2022, provisional application No. 63/491,296, filed on Mar. 21, 2023.

(51) Int. Cl.

| | |
|---|---|
| *H02J 7/35* | (2006.01) |
| *H02J 7/00* | (2006.01) |
| *H02S 20/30* | (2014.01) |
| *H02S 40/34* | (2014.01) |
| *H02S 40/38* | (2014.01) |

(52) U.S. Cl.
CPC .............. *H02J 7/35* (2013.01); *H02J 7/00045* (2020.01); *H02J 7/0045* (2013.01); *H02S 20/30* (2014.12); *H02S 40/34* (2014.12); *H02S 40/38* (2014.12); *H02J 2207/20* (2020.01)

(58) Field of Classification Search
CPC ........ H02J 7/35; H02J 7/0045; H02J 2207/20; H02S 20/30; H02S 40/38
USPC .......................... 320/101, 106, 107, 112, 113
See application file for complete search history.

(56) References Cited

U.S. PATENT DOCUMENTS

| | | | |
|---|---|---|---|
| 5,111,127 A * | 5/1992 | Johnson .............. | H01M 50/296 320/101 |
| 8,274,258 B2 | 9/2012 | Lloyd et al. | |
| 9,385,351 B2 | 7/2016 | Workman et al. | |
| 10,306,993 B1 * | 6/2019 | Clarke .................... | H02S 10/40 |
| 10,371,364 B2 * | 8/2019 | Gawthorp ........... | H01M 50/256 |
| 10,404,079 B2 | 9/2019 | Meoli | |
| 10,666,055 B2 * | 5/2020 | Garrity .................. | H02J 50/10 |
| 2015/0048778 A1 | 2/2015 | Davidson | |

(Continued)

FOREIGN PATENT DOCUMENTS

| | | |
|---|---|---|
| GB | 2466511 A | 6/2010 |
| KR | 20220045735 A | 4/2022 |

(Continued)

*Primary Examiner* — Richard V Muralidar
(74) *Attorney, Agent, or Firm* — Lucas & Mercanti, LLP

(57) ABSTRACT

A system for utilizing renewable energy includes a rechargeable battery adapted to store energy, a solar panel device, and an inverter device. The solar panel device includes a solar panel adapted to receive sunlight and generate energy and a battery charger coupled to the solar panel. The battery charger is adapted to receive energy from the solar panel and store energy in the rechargeable battery. The inverter device includes a power outlet and is adapted to receive energy from the rechargeable battery and produce an electric current via the power outlet.

14 Claims, 21 Drawing Sheets

(56) References Cited

U.S. PATENT DOCUMENTS

| | | | |
|---|---|---|---|
| 2016/0043591 A1* | 2/2016 | Oakley, Jr. | H02J 7/35 |
| | | | 320/101 |
| 2016/0149538 A1* | 5/2016 | Prypin | H02J 7/35 |
| | | | 136/245 |
| 2018/0269713 A1 | 9/2018 | Bead | |
| 2020/0106383 A1* | 4/2020 | Retti | H02S 30/20 |

FOREIGN PATENT DOCUMENTS

| | | |
|---|---|---|
| WO | 2019086454 A1 | 5/2019 |
| WO | 2021130665 A1 | 7/2021 |

\* cited by examiner

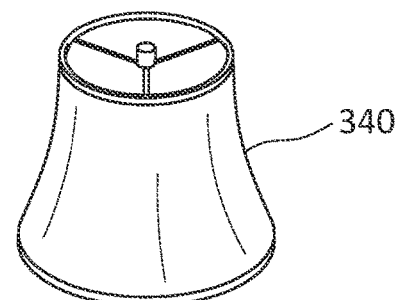
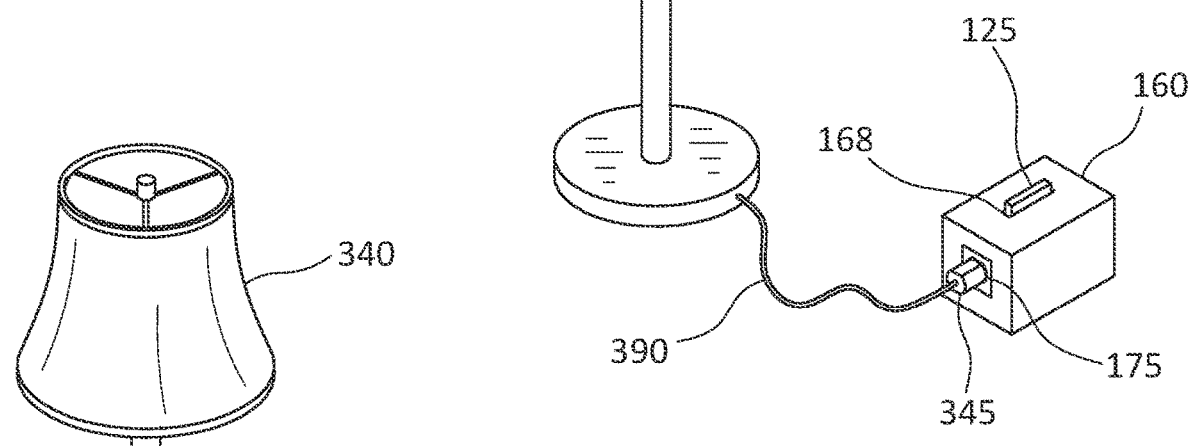
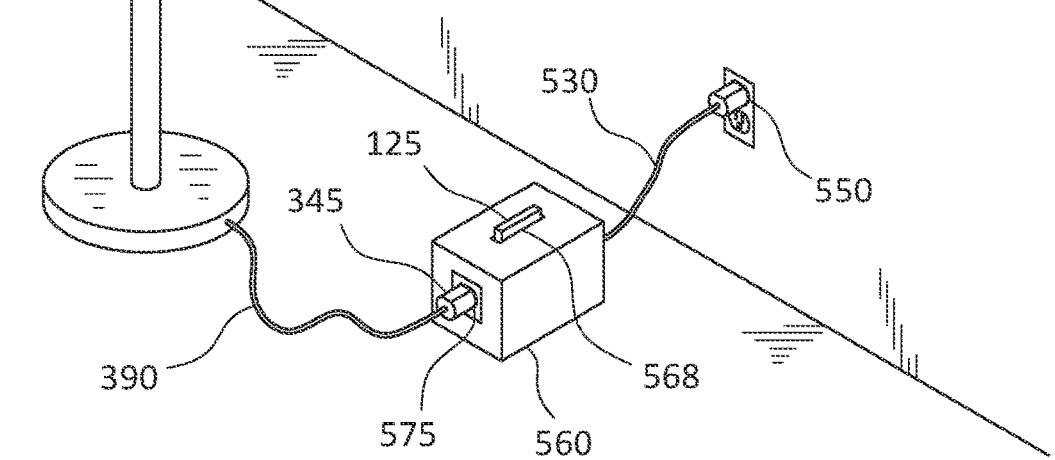

SYSTEMS, APPARATUS, AND METHODS FOR UTILIZING SOLAR ENERGY AND OTHER TYPES OF RENEWABLE ENERGY

CROSS REFERENCE TO RELATED APPLICATION

This application claims priority from U.S. Provisional Application No. 63/337,711 filed May 3, 2022 and U.S. Provisional Application No. 63/381,088 filed Oct. 26, 2022 and U.S. Provisional Application No. 63/491,296 filed Mar. 21, 2023, the contents of which are incorporated herein by reference.

TECHNICAL FIELD

This specification relates generally to the field of renewable energy, and more particularly to systems, apparatus, and methods for utilizing solar energy and other types of renewable energy.

BACKGROUND

Advances in solar panel technology make it realistic for an average family to have a system of solar panels installed on the roof of a house. The system of solar panels may then be connected to the home's existing electrical system. Installing such a system typically requires professional expertise in order to install the panels and to modify the home's electrical system. By installing solar panels in this manner a homeowner may utilize renewable energy and reduce monthly energy bills.

Other "Do-It-Yourself" systems are available which enable an individual to assemble a solar panel system which may be used to generate small amounts of power that may be needed while camping, boating, or "living off the grid." Assembling and using such "Do-It-Yourself" systems typically includes setting up one or more solar panels and connecting the panels to a power unit. This type of assembly requires a higher-than-average level of technical knowledge; consequently, use of such systems is not realistic for many people.

SUMMARY

Systems, apparatus, devices, and methods for utilizing renewable energy that advantageously require little or no technical knowledge to use are disclosed herein.

In accordance with an embodiment, a system for utilizing renewable energy is provided. The system includes a rechargeable battery adapted to store energy, a solar panel device, and an inverter device. The inverter device is not connected to the solar panel device. The solar panel device includes a solar panel adapted to receive sunlight and generate energy and a battery charger coupled to the solar panel. The battery charger is adapted to receive energy from the solar panel and store energy in the rechargeable battery. The inverter device includes a power outlet, and is adapted to receive energy from the rechargeable battery and produce an electric current via the power outlet.

In one embodiment, the solar panel includes a first surface comprising one or more photovoltaic cells and a second surface opposite the first surface. The battery charger is attached to the second surface.

In another embodiment, the battery charger includes a body having an external surface, an interior cavity within the body, the interior cavity adapted to hold at least a portion of the rechargeable battery, an opening in the external surface of the body, the opening adapted to allow the at least a portion of the rechargeable battery to be inserted into and removed from the interior cavity, and one or more connectors within the interior cavity, the connectors adapted to transfer energy into the rechargeable battery.

In another embodiment, the battery charger further includes a cover adapted to cover the opening. The cover has a closed position in which it covers the opening and an open position in which it does not cover the opening and allows the at least a portion of the rechargeable battery to be inserted into and removed from the interior cavity.

In another embodiment, the system includes a support structure coupled to the solar panel device, the support structure adapted to support the solar panel device in a selected position.

In another embodiment, the support structure includes a tripod or a plurality of legs.

In another embodiment, a central axis of the support structure passes through a center of gravity of the battery charger.

In another embodiment, the rechargeable battery is separate from the solar panel device and separate from the inverter device. The rechargeable battery is adapted to be manually inserted into and manually removed from the battery charger. The rechargeable battery is adapted to be manually inserted into and manually removed from the inverter device.

In another embodiment, the inverter device includes a body having an external surface, an interior cavity within the body, the interior cavity adapted to hold at least a portion of the rechargeable battery, an opening in the external surface of the body, the opening adapted to allow the at least a portion of the rechargeable battery to be inserted into and removed from the interior cavity, and one or more connectors within the interior cavity, the connectors adapted to receive energy from the rechargeable battery.

In another embodiment, the rechargeable battery further includes a memory storing a first code. The inverter device further includes a security system adapted to receive from a user a second code, determine whether the first code matches the second code, and allow the user to access the inverter device only if the first code matches the second code.

In another embodiment, the rechargeable battery further includes a memory storing a first code. The battery charger further includes a security system adapted to receive from a user a second code, determine whether the first code matches the second code, and allow the user to access the battery charger only if the first code matches the second code.

In accordance with another embodiment, a system includes a solar panel adapted to receive energy from sunlight, an inverter device having a power outlet adapted to provide an electric current, and a battery. The battery is adapted to be manually coupled to the solar panel, receive energy from the solar panel, store the energy, be manually decoupled from the solar panel, be manually coupled to the inverter device, and provide the energy to the inverter device.

In one embodiment, the system also includes a battery charger coupled to the solar panel. The battery charger is adapted to connect to the battery and provide energy to the battery.

In another embodiment, the solar panel and battery charger are coupled to a support structure adapted to hold the solar panel in a desired position.

In another embodiment, the inverter device further includes a receptacle adapted to receive the battery, a connector device adapted to connect to the battery and receive energy from the battery, and a device adapted to convert the energy received from the battery from a first form to a second form that can be provided via the power outlet.

These and other advantages of the present disclosure will be apparent to those of ordinary skill in the art by reference to the following Detailed Description and the accompanying drawings.

BRIEF DESCRIPTION OF THE DRAWINGS

FIG. 4 shows a lamp, an inverter device, and a rechargeable battery in accordance with the embodiment of FIG. 3;

FIG. 5 shows a lamp, an inverter device, and a rechargeable battery in accordance with another embodiment;

DETAILED DESCRIPTION

In accordance with an embodiment, a system for utilizing solar energy includes a rechargeable battery adapted to store energy. The system also includes a solar panel device having a solar panel adapted to receive sunlight and generate energy and a battery charger coupled to the solar panel. The battery charger is adapted to receive energy from the solar panel and store energy in the rechargeable battery. The system also includes an inverter device including a receptacle and at least one power outlet. The inverter device is adapted to receive the rechargeable battery via the receptacle, receive energy from the rechargeable battery, and produce an electric current via the power outlet. Advantageously, the system requires little or no technical knowledge to install and use.

Figure 1:
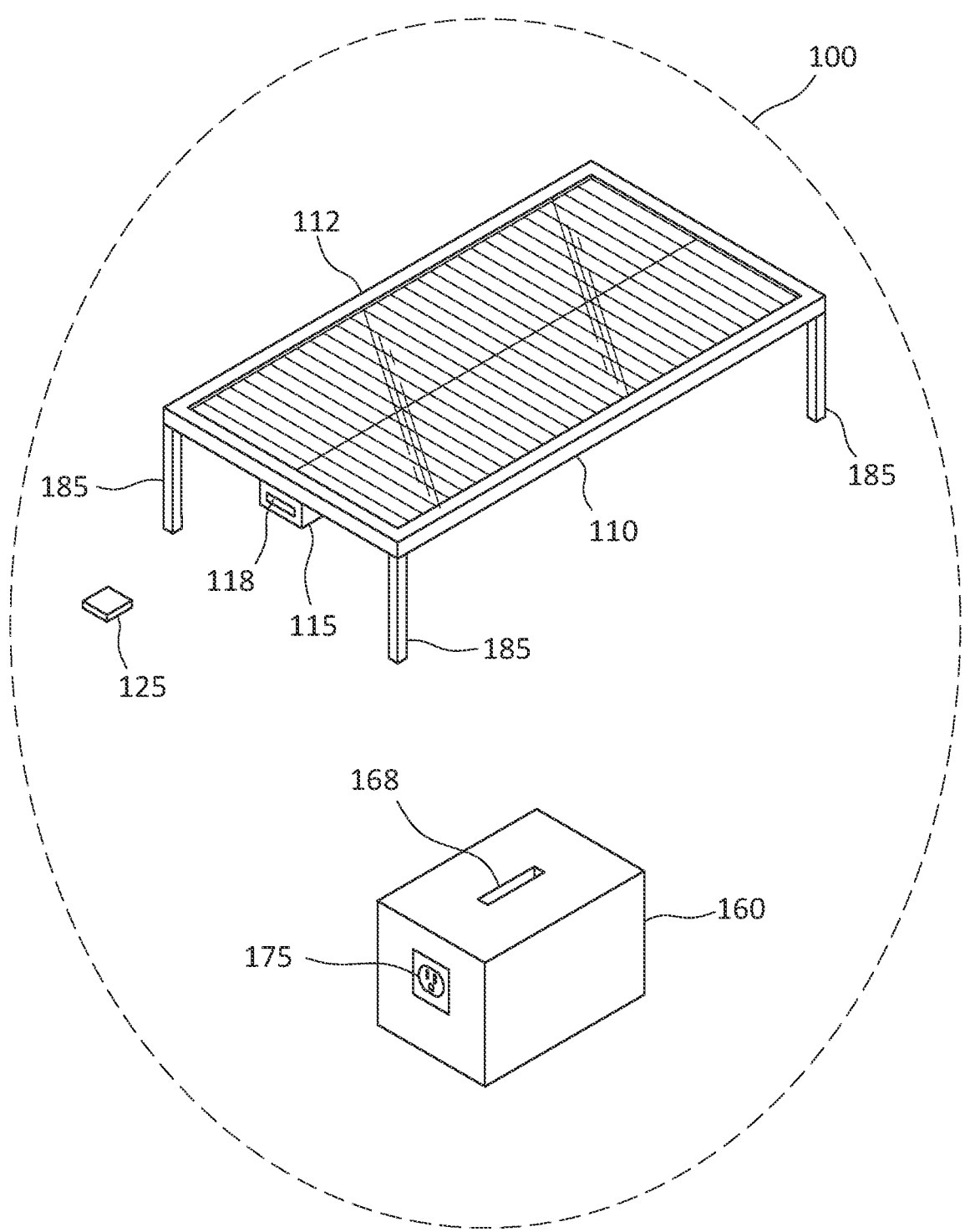
FIG. 1 shows a system for utilizing solar energy in accordance with an embodiment.

FIG. 1 shows a system for utilizing solar energy in accordance with an embodiment. System 100 includes a solar panel device 110, a rechargeable battery 125, and an inverter device 160.

Solar panel device 110 includes a solar panel 112, a battery charger 115, and a support structure. The support structure is adapted to hold solar panel 112 in a desired position. In the illustrative embodiment of FIG. 1, the support structure includes a plurality of legs 185. In other embodiments, more or fewer than four legs may be used. Legs 185 may be foldable. A stand or similar structure may be used. In other embodiments, other types of support structures may be used.

Battery charger 115 is adapted to receive and hold at least a portion of rechargeable battery 125. Battery charger 115 is adapted to receive energy from solar panel 112 and to provide energy to rechargeable battery 125. Rechargeable battery 125 is adapted to be manually inserted into and manually removed from battery charger 115, and to be manually inserted into and manually removed from inverter device 160.

Rechargeable battery 125 is a battery adapted to hold an amount of energy (charge) and to be recharged when some or all of the energy has been depleted. Rechargeable battery 125 may be any suitable type of rechargeable battery.

Inverter device 160 is separate and independent of solar panel device 110. Inverter device 160 is not adapted to be coupled to solar panel device 110 or solar panel 112.

Inverter device 160 is adapted to receive rechargeable battery 125 and convert the energy stored in rechargeable battery 125 into an electrical current. Inverter device 160 includes a receptacle 168 adapted to receive at least a portion of rechargeable battery 125 and a power outlet 175 adapted to provide an electrical current. Receptacle 168 includes a cavity adapted to hold at least a portion of rechargeable battery 125. An opening on an outer surface of inverter device 160 provides access to receptacle 168. Inverter device 160 may include two or more electrical contacts adapted to connect to corresponding terminals of rechargeable battery 125 in facilitate the production of an electrical current. Power outlet 175 may be a standard 120-volt power outlet that supplies 120 volts, for example. In other embodiments, other types of power outlets may be used. For example, power outlet 175 may supply 220 volts or 240 volts, or may supply another voltage.

Figure 2A:
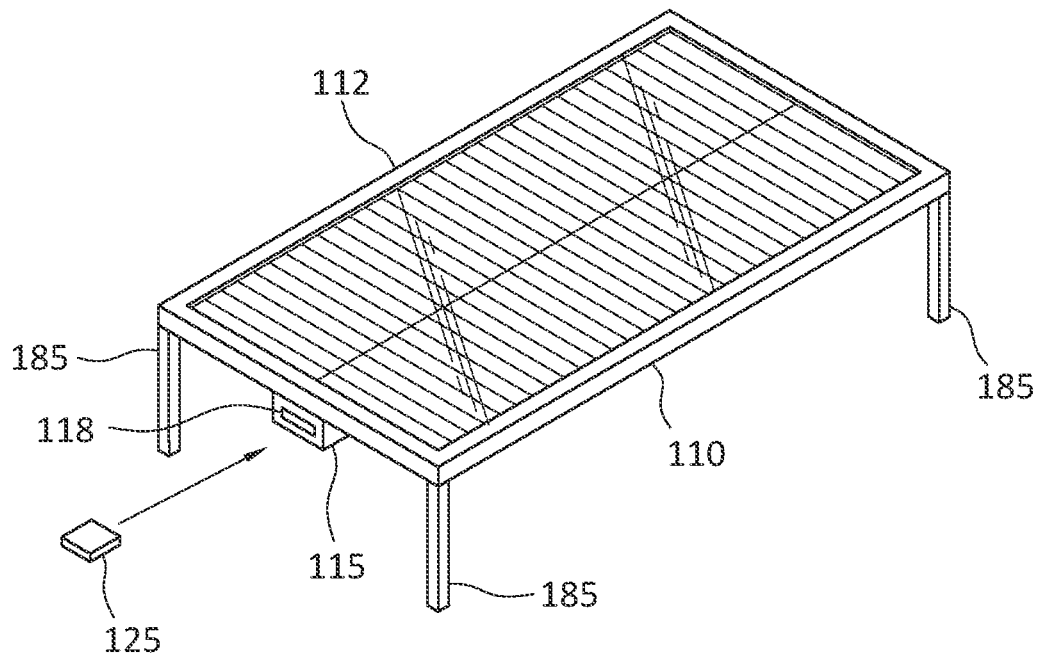
FIG. 2A shows a solar panel device in accordance with an embodiment.

FIG. 2A shows solar panel device 110 and rechargeable battery 125 in accordance with an embodiment. Solar panel device 110 includes solar panel 112, battery charger 115, and a support structure that includes legs 185. Solar panel 112 is adapted to receive sunlight and generate energy. Solar panels are known. Battery charger 115 includes a receptacle 118 adapted to receive rechargeable battery 125. Rechargeable battery 125 is adapted to fit into receptacle 118.

Figure 2B:
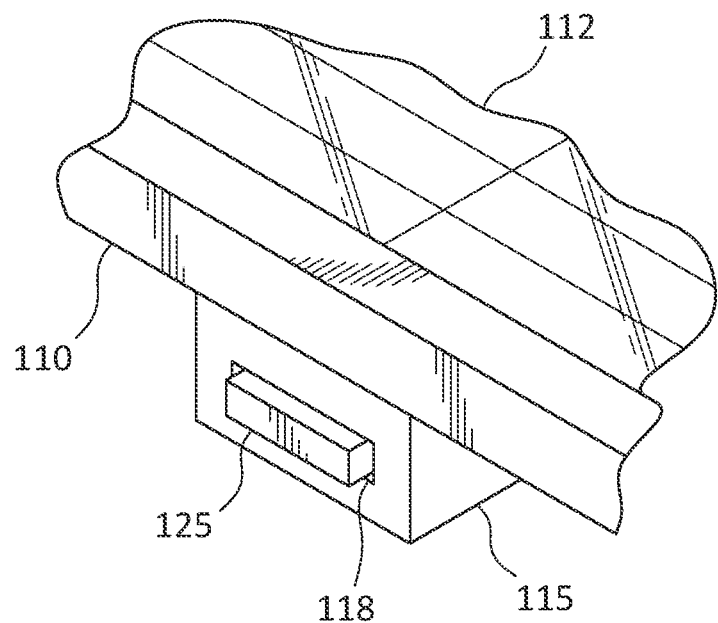
FIG. 2B shows a battery recharger of a solar panel device in accordance with an embodiment.

FIG. 2B shows battery charger 115 of solar panel device 110 in accordance with an embodiment. Battery charger 115 is coupled to solar panel 112. Battery charger 115 includes a receptacle 118 adapted to receive at least a portion of rechargeable battery 125. Receptacle 118 includes a cavity adapted to hold at least a portion of rechargeable battery 125. Rechargeable battery 115 is adapted to fit into receptacle 118. In FIG. 2B, rechargeable battery 125 is shown engaged in receptacle 118. In the illustrative embodiment, battery charger 115 includes an opening on an outer surface that provides access to receptacle 118. Battery charger 115 is adapted to charge rechargeable battery 125 when rechargeable battery 125 is engaged in receptacle 118. In one embodiment, battery charger 115 includes hardware adapted to receive energy from solar panel device 112 and store the energy in a suitable form in rechargeable battery 125.

In other embodiments, battery charger 115 may be adapted to connect to and recharge rechargeable battery 125 in another manner. For example, battery charger 115 may have a first connecter that connects to a second connector disposed on rechargeable battery 125.

In one embodiment, solar panel 112 has a first side or surface having one or more solar cells (or photovoltaic cells) or another material adapted to receive light and in response generate energy (for example, in the form of a voltage or current) and a second side or surface opposite the first side/surface, for example, the second side/surface being the underside of the solar panel 112. Battery charger 115 is attached to the underside of solar panel 112 and is preferably centrally located. For example, battery charger 115 may be positioned in a manner such that the weight of battery charger 115 is evenly distributed (in at least one dimension) across the central axis of the support structure. For example, in one embodiment, a central vertical axis of the support structure passes through the center of gravity of battery charger 115. Advantageously, a central location of battery charger 115 on the underside of solar panel 112 ensures that the battery charger's mass is centrally placed and equally distributed around the central axis of the support structure, thus minimizing or eliminating any problems that may arise from an unequally distributed mass. Also advantageously, a central location of the battery charger under the solar panel maximizes protection of the battery charger (and any battery inserted therein) from rain and other weather conditions.

In an illustrative embodiment, battery charger 115 has a body having a generally rectangular prism or cuboid shape with an opening on one external side. In other embodiments, the body may have a different shape and the opening may be anywhere on the external surface of the body. The opening has a size adapted to receive rechargeable battery 125. Battery charger 115 has an interior cavity within the volume of the rectangular prism; the interior cavity functions as a receptacle for rechargeable battery 125. In one embodiment, the cavity is adapted to receive the entirety of rechargeable battery 125. In another embodiment, the cavity is adapted to receive a portion of the body of rechargeable battery 125. The opening functions as a port allowing the rechargeable battery to be inserted into and removed from the cavity.

In one embodiment, a user may insert rechargeable battery 125 into the opening of battery charger 115. When inserted in this manner, rechargeable battery 125 slides or otherwise moves entirely into the interior cavity of battery charger 115 and connects to one or more connectors within battery charger 115. The connectors are adapted to transfer energy (for example, in the form of a current) from solar panel 112 into rechargeable battery 125. Rechargeable battery may be recharged in this manner. Subsequently, the user may remove rechargeable battery 125 from battery charger 115.

Figure 2C:
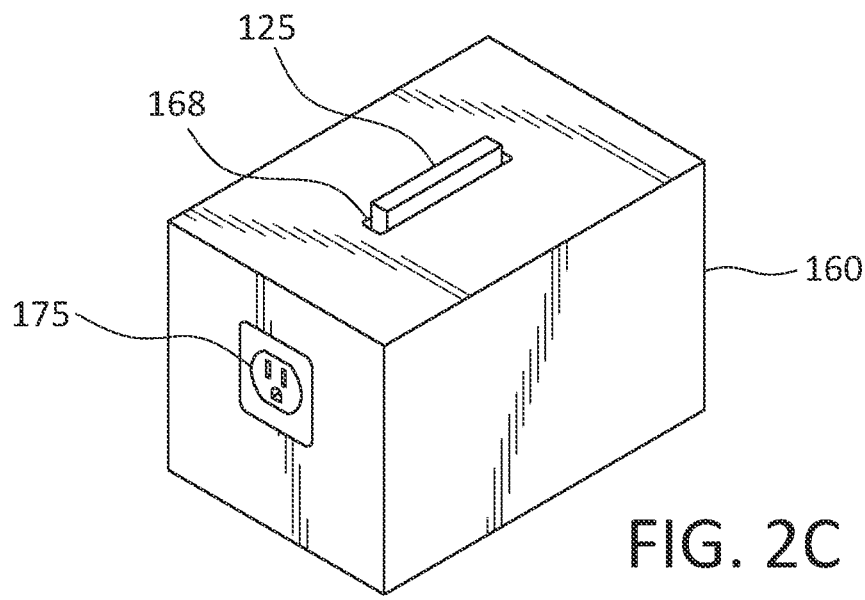
FIG. 2C shows an inverter device in accordance with an embodiment.

FIG. 2C shows inverter device 160 in accordance with an embodiment. Inverter device 160 includes a receptacle 168 and a power outlet 175. Receptacle 168 is adapted to receive at least a portion of rechargeable battery 125. In FIG. 2C, rechargeable battery 125 is shown engaged in receptacle 168. In the illustrative embodiment, an opening on the top side of inverter device 160 provides access to receptacle 168. Inverter device 160 is adapted to receive power from rechargeable battery 125 when rechargeable battery 125 is engaged in receptacle 168 and to provide power in the form of an electrical current via power outlet 175. Inverter device 160 includes hardware adapted to receive energy from rechargeable battery 125 and to produce an electrical current via power outlet 175. Inverter device 160 may receive from rechargeable battery 125 energy in a first form, such as a direct current, and convert the energy to a second form, such as an alternating current. In one embodiment, power outlet 175 is a standard 120-volt outlet. In other embodiments, power outlet 175 may be a different type of power outlet.

In other embodiments, inverter device 160 may be adapted to connect to and receive energy from rechargeable battery 125 in another manner. For example, inverter device 160 may have a first connecter that connects to a second connector disposed on rechargeable battery 125.

System 100 advantageously requires little or no technical knowledge to install and use. Accordingly, anyone can easily install and use the system to utilize solar energy.

In accordance with an illustrative embodiment, a user places solar panel device 110 in a suitable location where it is exposed to sunlight. For example, the user may place solar panel device 110 in a sunny location in the user's yard. In one embodiment, no electrical connections need be made in order to set up solar device 110. The user then manually inserts rechargeable battery 125 into receptacle 118 of battery charger 115.

After the user has placed solar panel device 110 in a desired location and inserted rechargeable battery 125, solar panel 112 of solar panel device 110 receives sunlight and generates energy. The energy is transmitted to battery charger 115 and is stored in rechargeable battery 125.

Figure 3:
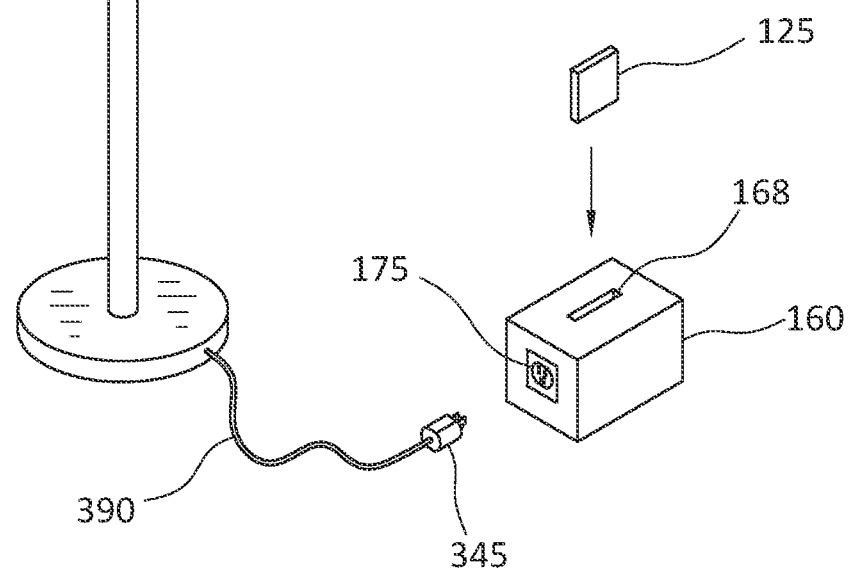
FIG. 3 shows a lamp, an inverter device, and a rechargeable battery in accordance with an embodiment.

In an illustrative embodiment, when rechargeable battery 125 is fully charged, the user manually removes rechargeable battery 125 from receptacle 118 and carries rechargeable battery 125 into the user's home. Supposing that the user wishes to use rechargeable battery 125 to power a lamp located in a room of the user's home, the user places inverter device 160 in the room, next to the lamp. FIG. 3 shows a lamp 340 and inverter device 160 in accordance with an embodiment. Lamp 340 includes a power cord 390 with a plug 345 adapted to fit into and receive power from a standard power outlet.

In the illustrative embodiment, the user places rechargeable battery 125 (which is fully charged) into receptacle 168 of inverter device 160. The user also inserts lamp plug 345 into power outlet 175 of inverter device 160. FIG. 4 shows lamp 340 and inverter device 160 in accordance with an embodiment. In FIG. 4, lamp plug 345 is inserted into power outlet 175 of inverter device 160.

When the lamp is plugged into power outlet 175 of inverter device 160, energy from rechargeable battery 125 is converted into electrical current and provided to lamp 340. In this manner, lamp 340 is powered by rechargeable battery 125 until the energy stored in rechargeable battery 125 is depleted.

Existing solar power devices include a solar panel and a "power station" device adapted to connect directly to the solar panel. The device may include one or more power outlets. The device may be adapted to receive energy from the solar panel and to provide power via the power outlet(s). These devices can be useful for outdoor activities such as camping or "living off the grid." However, these devices are typically sizable, heavy, bulky, and cumbersome, and difficult for many people to carry. Furthermore, typically it is necessary to use one or more connectors to connect the solar panel to the power station. Many people who are not technically inclined find it difficult to connect and disconnect these devices to a solar panel.

Consequently, these existing "power station" devices are impractical and inconvenient for home use. In order to use one of these existing devices to power an appliance within the home, it would be necessary either to run a wire from the device into the home (while the device is located outdoors, connected to the solar panel), or to disconnect the device from the solar panel, carry it into the home, and connect it to the appliance. However, running a long wire from the yard into the home is not only technically challenging for many people but is also potentially dangerous. On the other hand, power stations are typically heavy and bulky; therefore, carrying the power station between the yard and inside the home is difficult or impossible to do for many people. Consequently, both of these options are inconvenient, impractical, or even impossible for many people.

Advantageously, the inventive systems, devices, apparatus, and methods described herein solve the problems associated with existing systems. The inventive systems described herein make it possible for a user who is not technically inclined and/or is not capable or desirous of carrying a large, cumbersome power station back and forth between the interior of a home and the yard to use a solar panel to power an appliance within the home. The user does not need to connect/disconnect a "power station" device but instead needs to perform the much easier tasks of inserting and removing a battery from the battery charger of the solar panel device, carrying the battery from the yard into the interior of the home, inserting the battery into the inverter device within the home, and plugging the appliance into the inverter device. The inverter device remains permanently inside the home. Only the battery need be transported between the exterior and interior of the home. The relatively small battery is significantly lighter in weight than a "power station" device or inverter device, and therefore is significantly easier to carry.

Advantageously, systems, devices, and methods described herein may be used to provide power in homes and in villages in areas of the world where electricity is not readily available.

FIG. 5 shows an inverter device in accordance with another embodiment. Inverter device 560 includes a receptacle 568 adapted to receive rechargeable battery 125, a power outlet 575, and a power cord 530. For example, power cord 530 may be adapted to fit into a standard 120-volt power outlet disposed in a wall of the user's home. In FIG. 5, lamp 340 is plugged into power outlet 575 of inverter device 560, and power cord 530 of inverter device 560 is plugged into a power outlet 550 in a wall of the user's home. Rechargeable battery 125 is inserted into receptacle 568 of inverter device 560.

Advantageously, inverter device 560 is adapted to draw power first from rechargeable battery 125. After the energy stored in rechargeable battery 125 is depleted, inverter device 560 draws power from power outlet 550 (in the wall of the user's home). In this manner, the user may advantageously ensure that power is provided to lamp 340 continuously and without interruption—first from rechargeable battery 125, and second, from the electrical system of the user's home.

In other embodiments, an inverter device may include a plurality of receptacles adapted to receive rechargeable batteries and/or a plurality of power outlets adapted to produce electrical current. Thus, advantageously, such an inverter device may enable a user to use multiple rechargeable batteries to power one or more appliances for a longer period of time.

Figure 6:
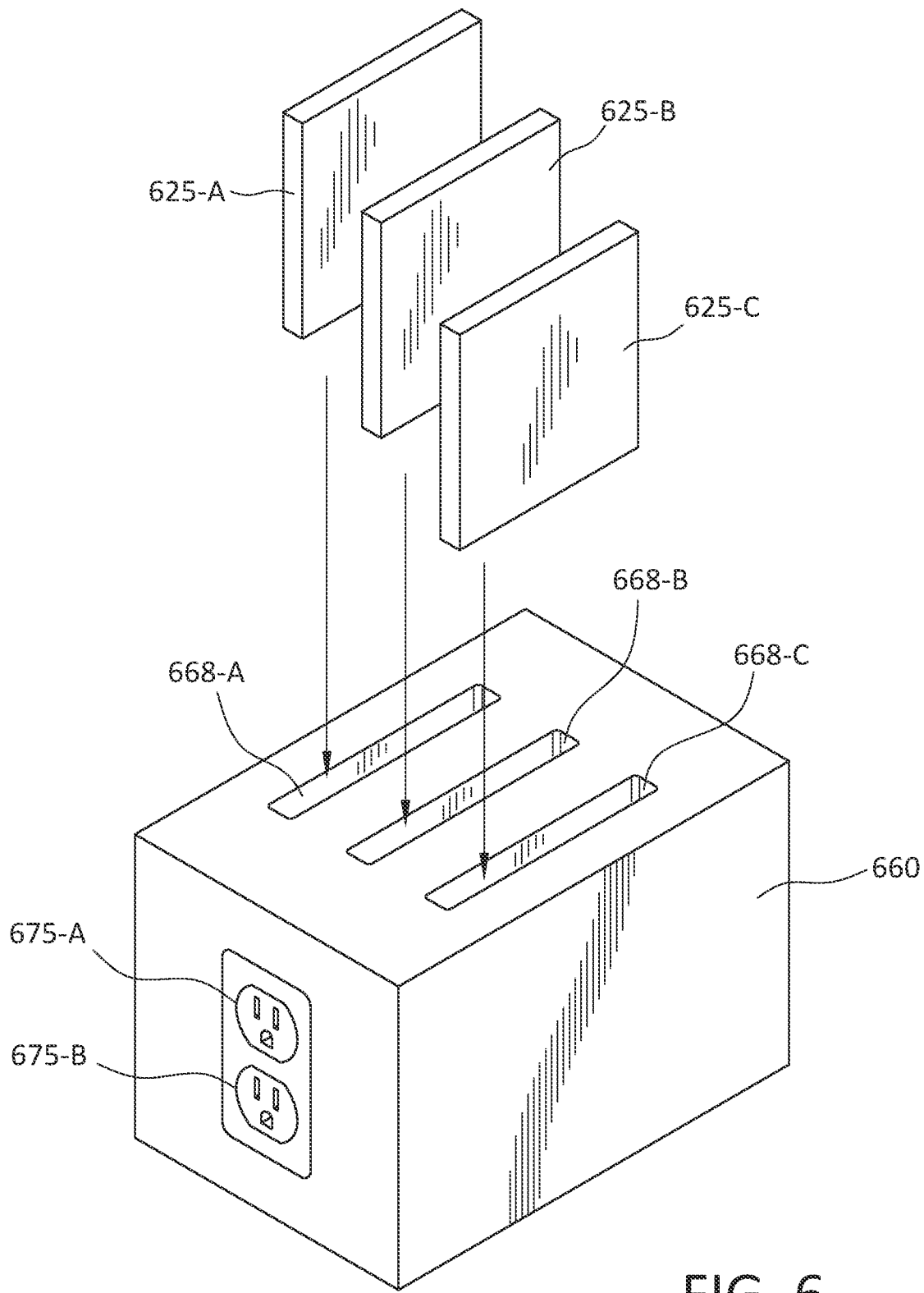
FIG. 6 shows an inverter device in accordance with another embodiment.

FIG. 6 shows an inverter device in accordance with another embodiment. Inverter device 660 includes a plurality of receptacles 668-A, 668-B, and 668-C. Inverter device 660 also includes a plurality of power outlets 675-A and 675-B. In other embodiments, more or fewer than three receptacles and more or fewer than two power outlets may be included.

Each receptacle 668-A, 668-B, 668-C is similar to receptacle 168 of inverter device 160 shown in FIG. 1. Thus, each receptacle 668 is adapted to receive at least a portion of a respective rechargeable battery. In the illustrative embodiment, three rechargeable batteries 625-A, 625-B, 625-C are shown. Each rechargeable battery 625 is similar to rechargeable battery 125 of FIG. 1.

Figure 7:
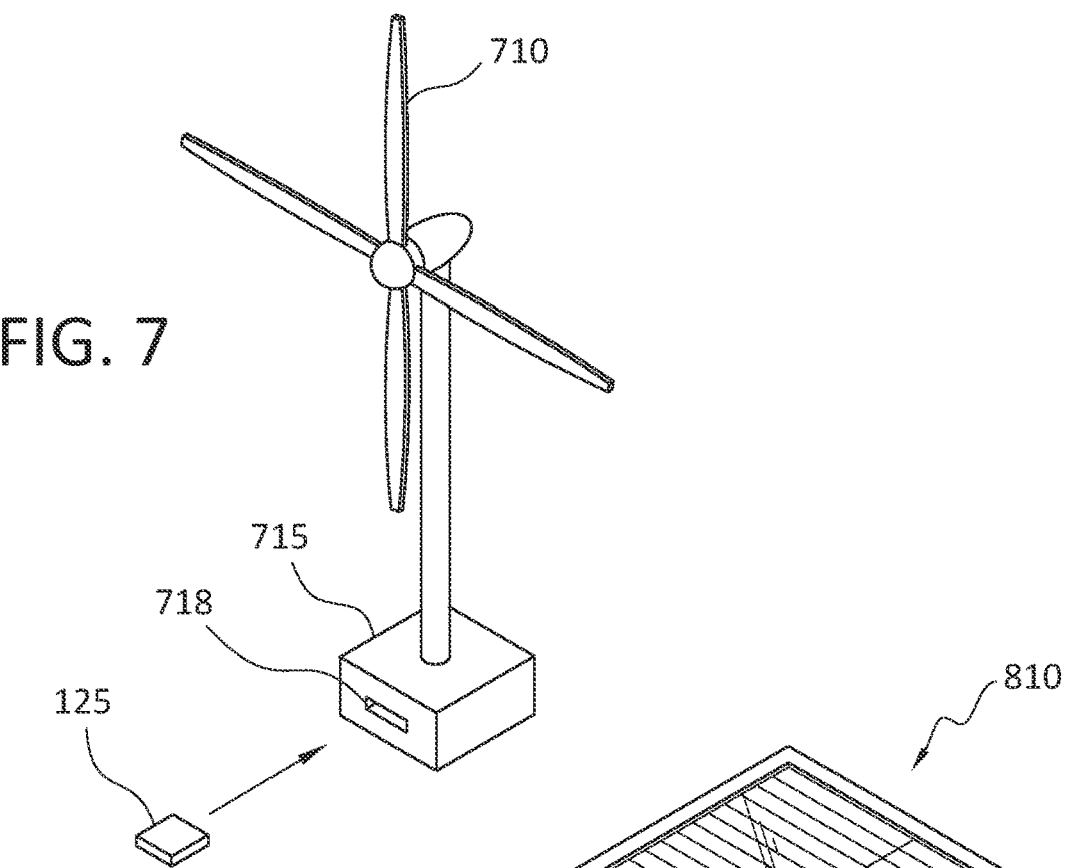
FIG. 7 shows a system for utilizing wind power in accordance with an embodiment.

In other embodiments, a system similar to the system of FIG. 1 may be used to utilize other forms of renewable energy. FIG. 7 shows components of a system for utilizing wind energy in accordance with an embodiment. The system includes a wind turbine 710, a battery charger 715 coupled to wind turbine 710, and a rechargeable battery 125. Battery charger 715 includes a receptacle 718 adapted to receive rechargeable battery 125. The system may also include a suitable inverter device similar to inverter device 160 shown in FIG. 1. The blades of wind turbine 710 turn, and wind turbine 710 generates energy from the movement of the blades. Battery charger 715 receives energy from wind turbine 710 and stores the energy in rechargeable battery 125.

In another embodiment, a support structure of solar panel device 110 may include a tray 825 adapted to hold solar panel 112 and a plurality of legs adapted to support the tray and solar panel 112. Battery charger 115 may be attached to the support structure.

Figure 8:
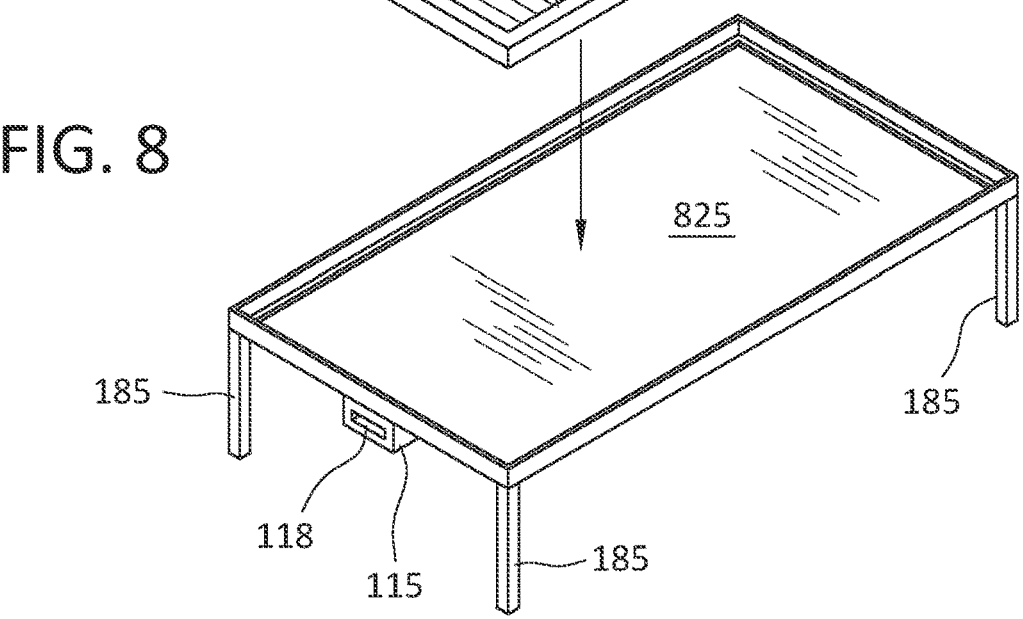
FIG. 8 shows components of a solar panel device in accordance with another embodiment.

FIG. 8 shows a solar panel device in accordance with an embodiment. Solar panel device 810 includes solar panel 812, a support structure including a tray 825 and legs 185. Battery charger 115 is attached to tray 825. Solar panel 112 is adapted to fit into tray 825. When solar panel 112 is secured in tray 825, solar panel 112 is electrically connected to battery charger 115 by one or more wires, connectors, or in another manner.

Figure 9A:
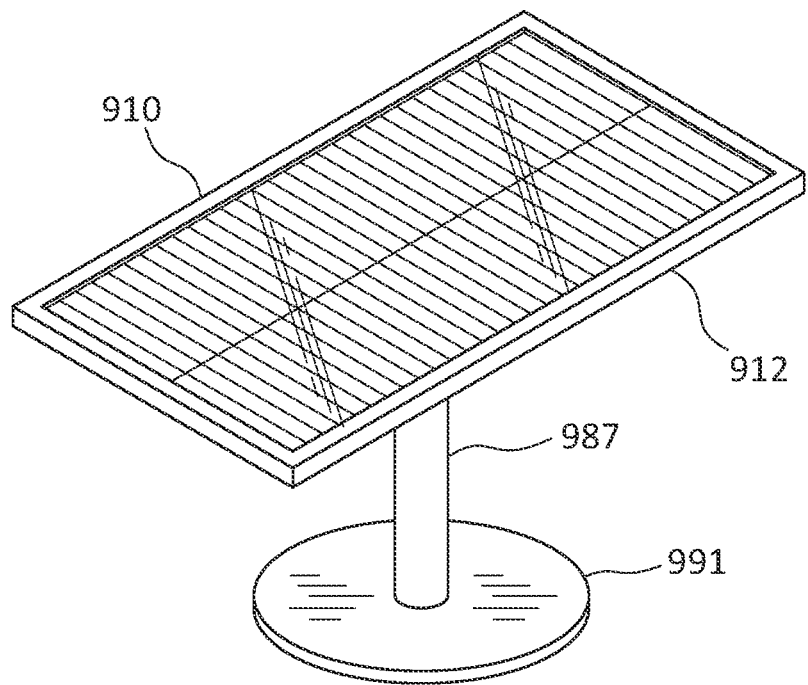
FIG. 9A is a perspective view of a solar panel device in accordance with an embodiment.

In other embodiments, a solar panel device may use a different type of support structure. FIG. 9A is a perspective view of a solar panel device in accordance with another embodiment. Solar device 910 includes a solar panel 912, a support column 987 and a base 991.

Figure 9B:
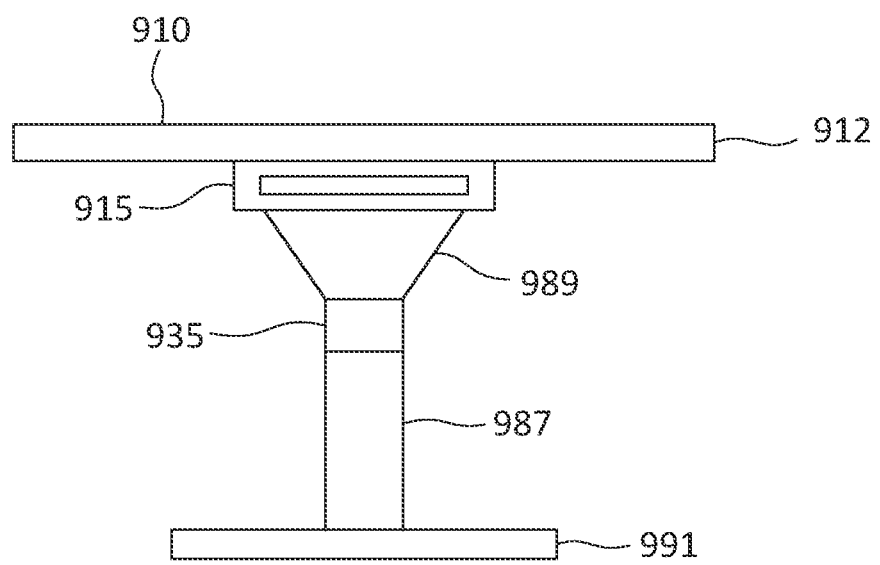
FIGS. 9B-9D show side views of a solar panel device in accordance with an embodiment.
Figure 9C:
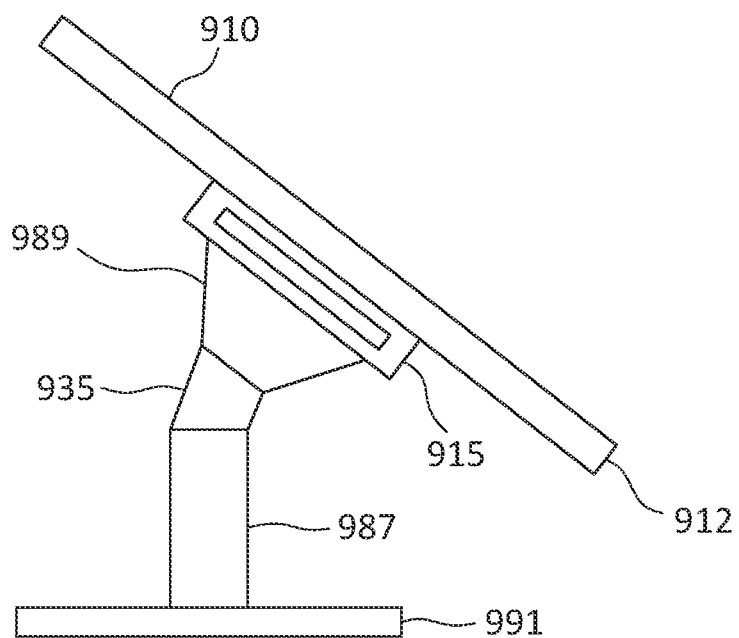
Figure 9D:
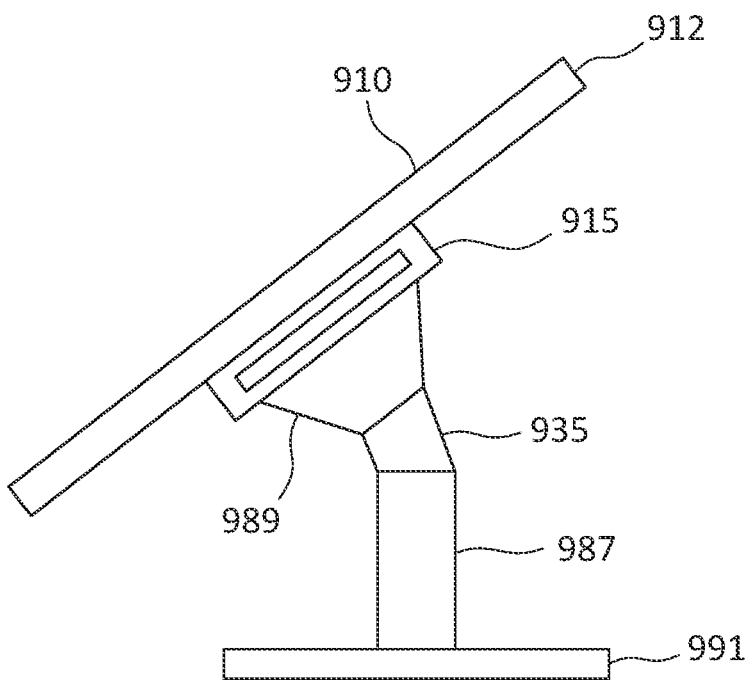

FIGS. 9B-9D show side views of a solar panel device in accordance with an embodiment. Solar panel device 910 includes solar panel 912, a battery charger 915, a support element 989, an adjustable support element 935, support column 987, and base 991. Base 991 is a round element formed of plastic, metal, or another suitable material.

Support column 987 is disposed on based 991. Adjustable support element 935 is disposed on and supported by support column 987. Support element 989 is disposed on and supported by adjustable support element 935. Battery charger 915 is disposed on and supported by support element 989. Solar panel 912 is disposed on and supported by battery charger 915. In other embodiments, components similar to those shown in FIGS. 9B-9D may be arranged in a different configuration.

Adjustable support element 935 is adapted to move or tilt between multiple positions to allow solar panel 912 to be oriented at different angles. FIGS. 9B-9D illustrate adjustable support element 935 and solar panel 912 in different positions in accordance with an embodiment. In FIG. 9B, adjustable support element 935 is in a first position which causes solar panel 912 to be oriented at a first angle (horizontal). In FIG. 9C, adjustable support element 935 is in a second position which causes solar panel 912 to be oriented at a second angle. In FIG. 9D, adjustable support element 935 is in a third position which causes solar panel 912 to be oriented at a third angle.

Advantageously, adjustable support element 935 as shown in FIGS. 9B-9D may be manually adjusted to a selected position. For example, a user may move adjustable support element 935 to a selected position to ensure that solar panel 912 is oriented at an angle to receive an optimal amount of sunlight. The user may move adjustable support element several times throughout the day as the sun travels across the sky.

Advantageously, the feature enabling a user to manually control the position of adjustable support element 935 allows the user to adjust the position of solar panel 912 to maximize the amount of solar energy received by the solar panel, and thus to maximize the amount of energy stored in a rechargeable battery.

In accordance with another embodiment, a solar panel device includes a solar tracking system that estimates or determines a position of the sun and automatically moves adjustable support element 935 to place solar panel 912 in a desired orientation relative to the position of the sun. The solar tracking system may move adjustable support element 935 occasionally, periodically, or continually throughout the day.

Figure 9E:
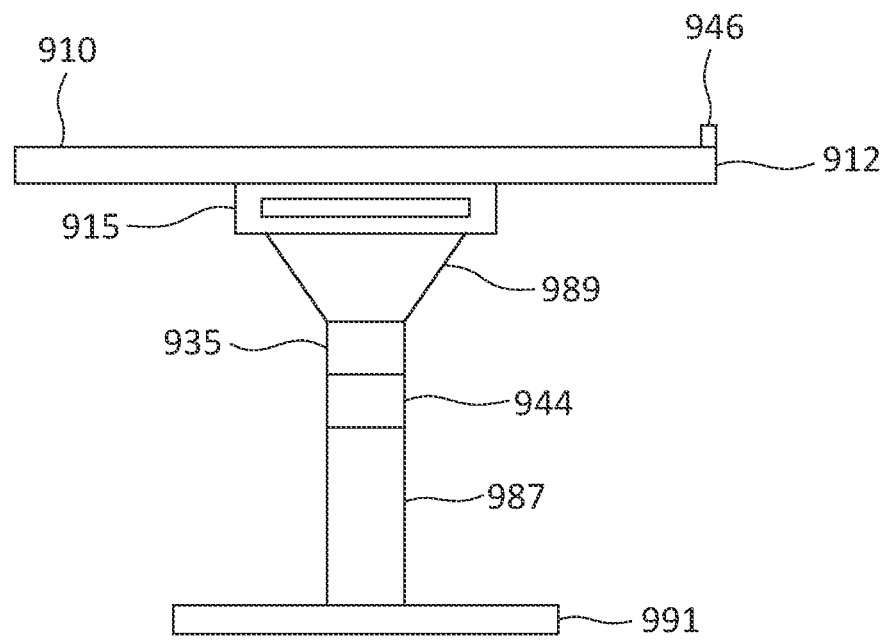
FIG. 9E shows a solar panel device in accordance with another embodiment.

FIG. 9E shows a solar panel device in accordance with another embodiment. Solar panel device 910 includes solar panel 912, battery charger 915, support element 989, adjustable support element 935, support column 987, and base 991. Solar panel device 910 also includes a solar tracking system that includes a light sensor 946 and a solar tracking controller 944.

In the illustrative embodiment, light sensor 946 is disposed on or attached to solar panel 912. In other embodiments, light sensor 946 may be disposed in another location. Light sensor 946 detects sunlight and generates light data relating to the light detected. For example, light sensor 946 may generate light data including information related to the level or intensity of light detected, the incident angle of the light detected, etc. Light sensor 946 transmits the light data to solar tracking controller 944.

Solar tracking controller 944 receives the light data from light sensor 946 and estimates or determines a relative position of the sun based on the light data. Solar tracking controller 944 automatically moves adjustable support element 935 to a selected position based on the estimated position of the sun. Advantageously, solar tracking controller 944 may automatically adjust the position of solar panel 912 to maximize an amount of energy received from the sun.

Figure 9F:
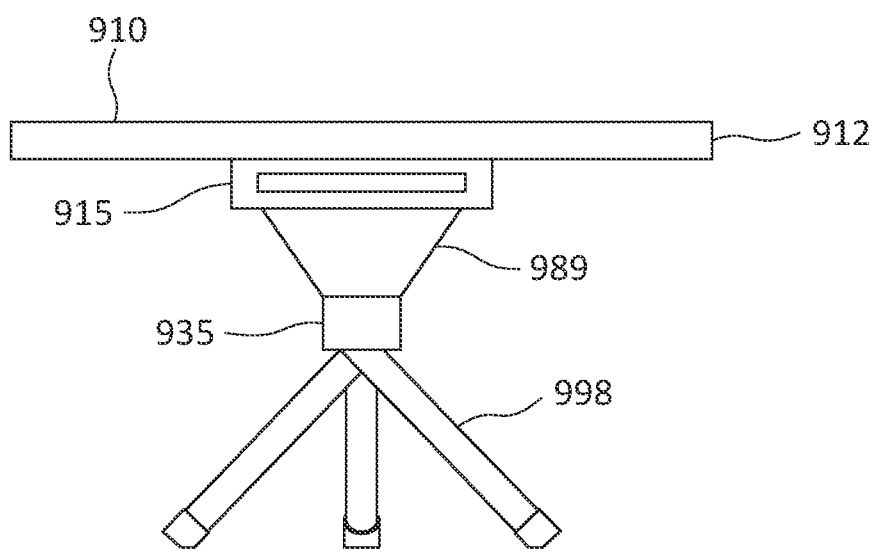
FIG. 9F shows a solar panel device in accordance with another embodiment.

In another embodiment, the support structure for a solar panel device includes a tripod. FIG. 9F shows a solar panel device in accordance with an embodiment. Solar panel device 910 includes solar panel 912, battery charger 915, support element 989, adjustable support element 935, and support structure 998. Support structure 998 is a tripod, which advantageously provides support and stability to other components of the solar panel device.

Figure 9G:
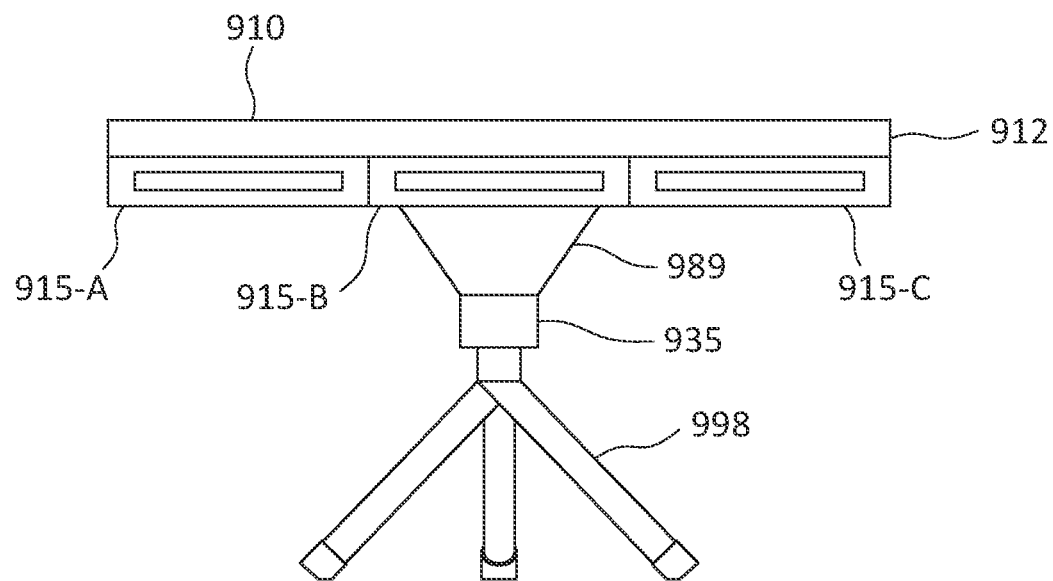
FIG. 9G shows a solar panel device in accordance with another embodiment.

In another embodiment, a solar panel device may include a solar panel and a plurality of battery charging devices. FIG. 9G shows a solar panel device in accordance with an embodiment. Solar panel device 910 includes solar panel 912, a plurality of battery chargers 915-A, 915-B, 915-C, support element 989, adjustable support element 935, and support structure 998.

Figure 10:
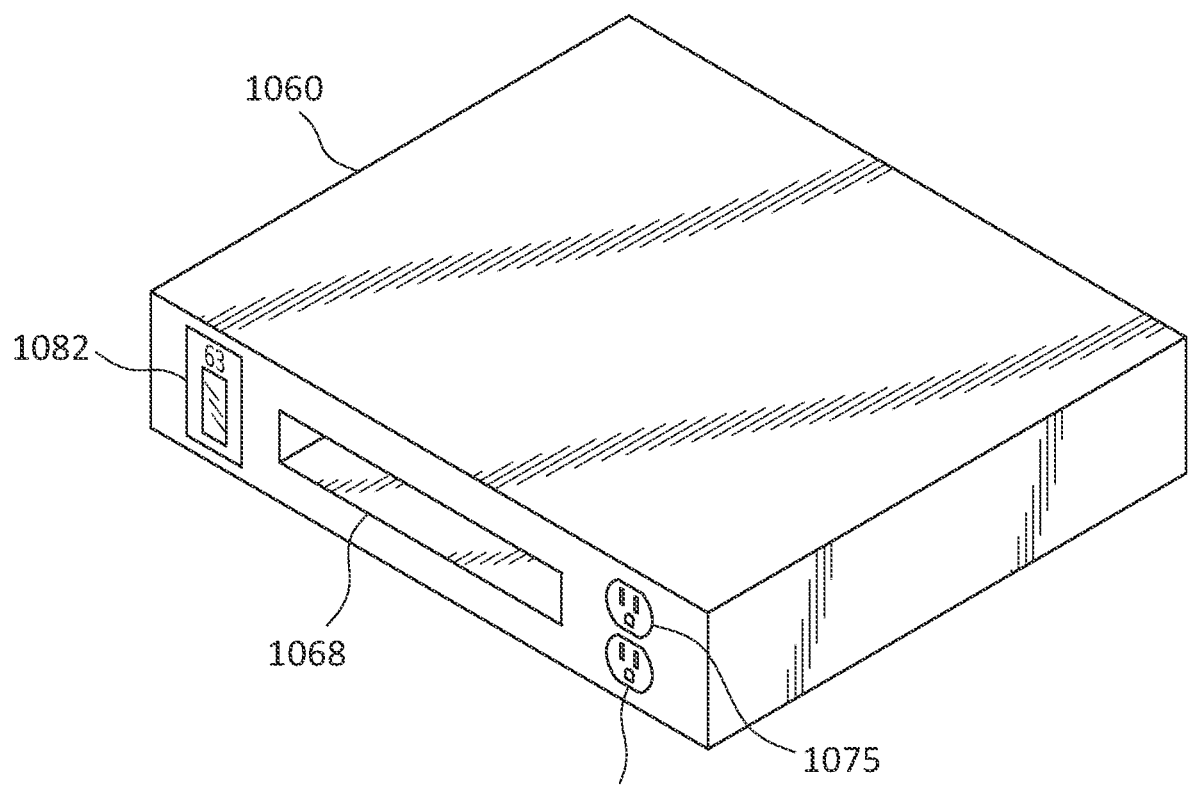
FIG. 10 shows a perspective view of an inverter device in accordance with another embodiment.

FIG. 10 shows a perspective view of an inverter device in accordance with another embodiment. Inverter device 1060 includes a battery receptacle 1068 adapted to receive a rechargeable battery, an indicator 1082 adapted to indicate a level of charge held by the rechargeable battery, and two power outlets 1075, 1076.

Figure 11:
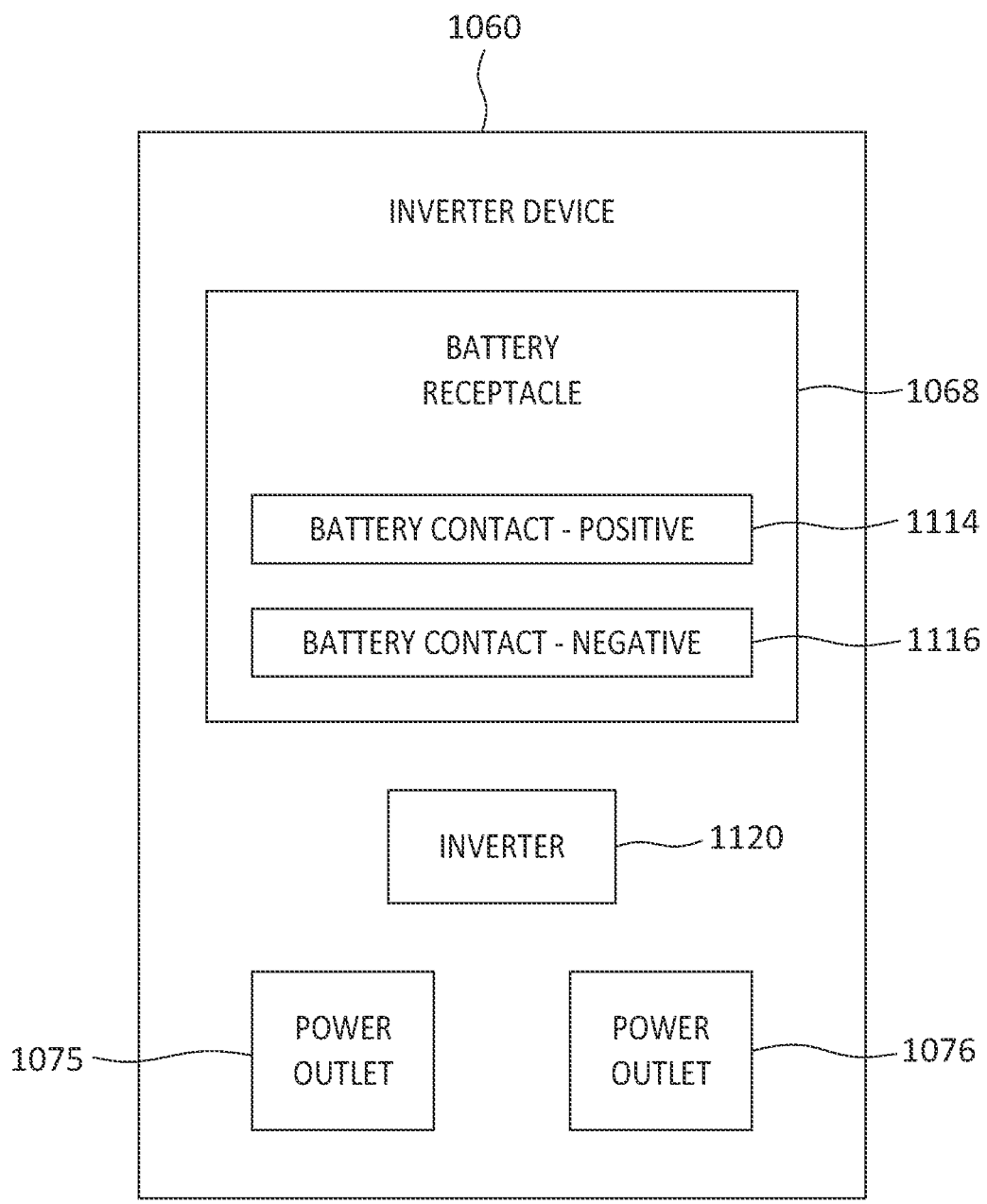
FIG. 11 shows functional components of an inverter device in accordance with an embodiment.

FIG. 11 shows functional components of an inverter device in accordance with an embodiment. Inverter device 1060 includes a battery receptacle 1068, an inverter component 1120, and two power outlets 1075, 1076. Battery receptacle 1068 includes a positive battery contact 1114 and a negative battery contact 1116.

When a user places a rechargeable battery into battery receptacle 1068, terminals on the rechargeable battery contact positive and negative battery contacts 1114, 1116. Contact between the rechargeable battery and contacts 1114, 1116 generates a direct current.

Inverter component 1120 converts the direct current to an alternating current. The alternating current is provided to power outlets 1075, 1076.

While FIG. 11 illustrates one arrangement of components of an inverter device, in other embodiments, an inverter device may include other components and function in a different manner to obtain energy from a rechargeable battery and provide the energy via a power outlet.

Figure 12A:
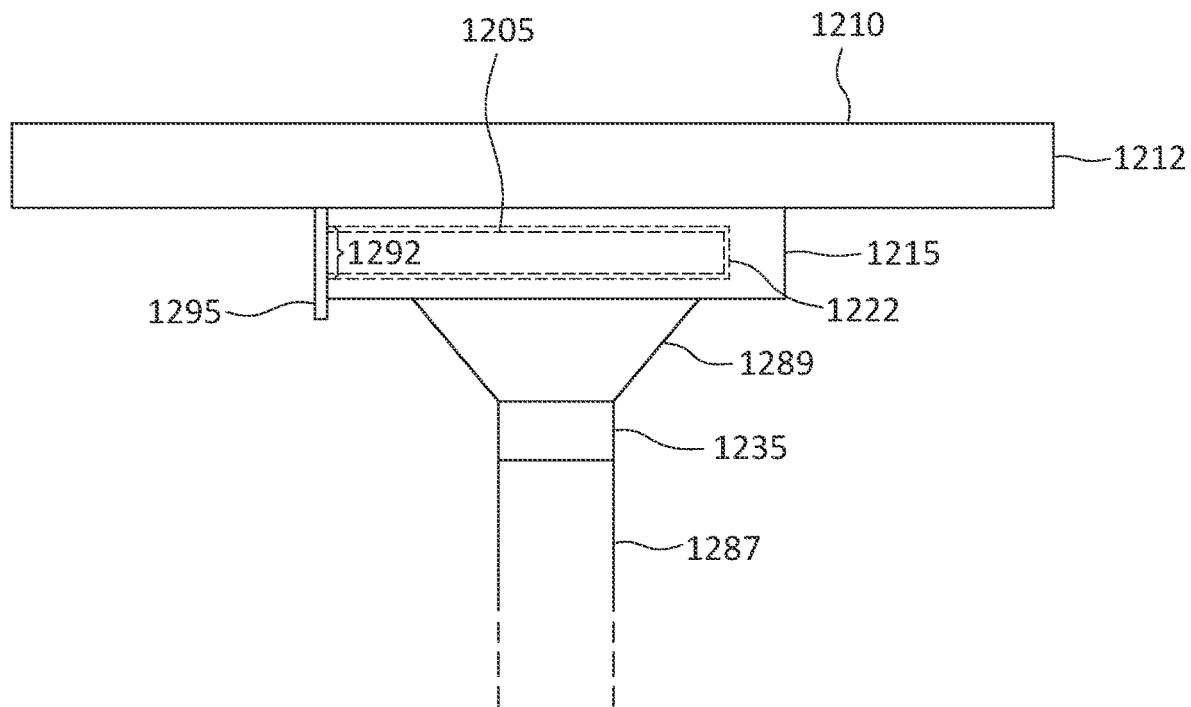
FIGS. 12A-12B show a solar panel device in accordance with another embodiment.
Figure 12B:
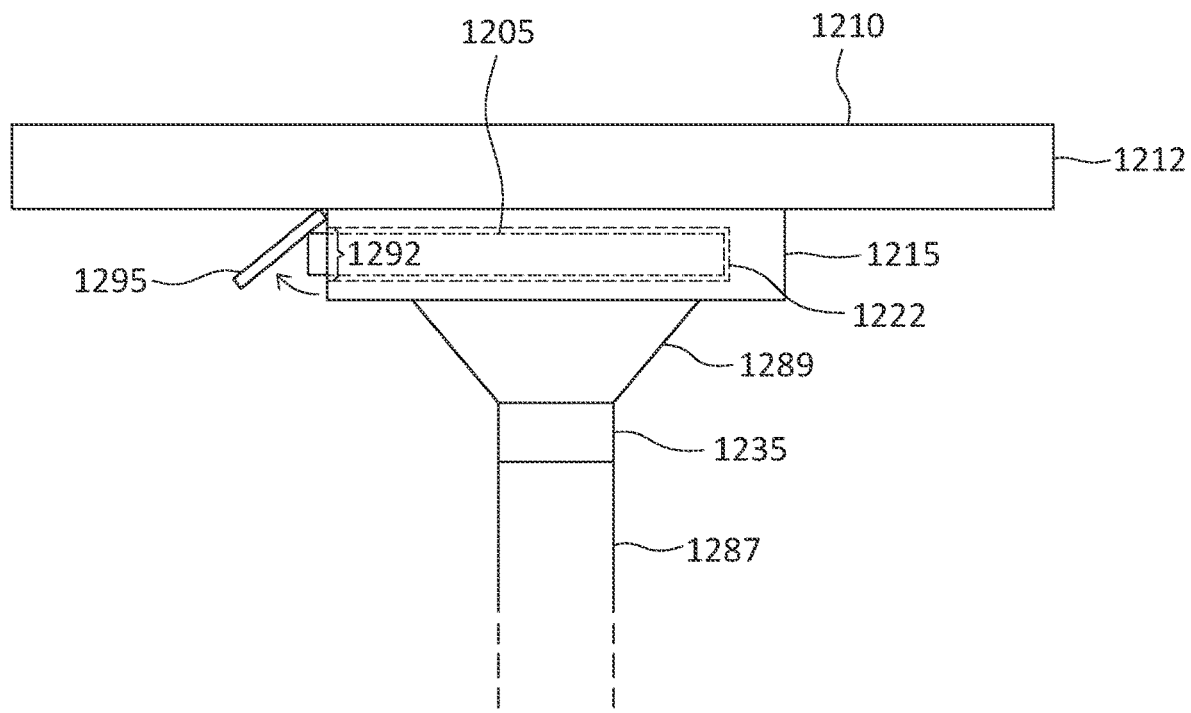

In accordance with another embodiment, a solar panel device includes a battery charger device with a waterproof cover or door that protects at least a portion of the battery charger, and any rechargeable battery held therein, from rain and other natural elements. FIGS. 12A-12B show a solar panel device in accordance with an embodiment. Solar panel device 1210 includes a solar panel 1212, a battery charger 1215, a support element 1289, an adjustable support element 1235, a support column 1287, and a base (not shown in FIGS. 12A-12B). Battery charger 1215 includes a receptacle 1222 adapted to hold a rechargeable battery, and an opening 1292 that provides access to receptacle 1222. Solar panel device 1210 also includes a cover 1295 adapted to cover the front side (including opening 1292) of battery charger device 1215.

In the illustrative embodiment of FIGS. 12A-12B, battery charger device 1215 holds a rechargeable battery 1205 within receptacle 1222. In FIG. 12A, rechargeable battery 1205 is disposed entirely within receptacle 1222.

Cover 1295 has a closed position and an open position. In FIG. 12A, cover 1295 is in the closed position. In the closed position, cover 1295 covers and protects receptacle 1222 and opening 1292 of battery charger 1215, and thus also protects rechargeable battery 1205 which is inside battery charger device 1215. In FIG. 12B, cover 1295 is in the open position. When cover 1295 is in the open position, cover 1295 does not cover opening 1292 of battery charger device 1215; accordingly, a user may insert rechargeable battery 1205 into or retrieve rechargeable battery 1205 from battery charger 1215 via opening 1292. In FIG. 12B, cover 1295 is in the open position and rechargeable battery 1205 is partially removed from battery charger device 1215.

In accordance with an embodiment, a method of using a solar energy system is provided. Using the method, a user may employ a solar energy system such as that shown in FIG. 1 to gather energy from sunlight and use the energy to power an appliance in the home.

Figure 13A:
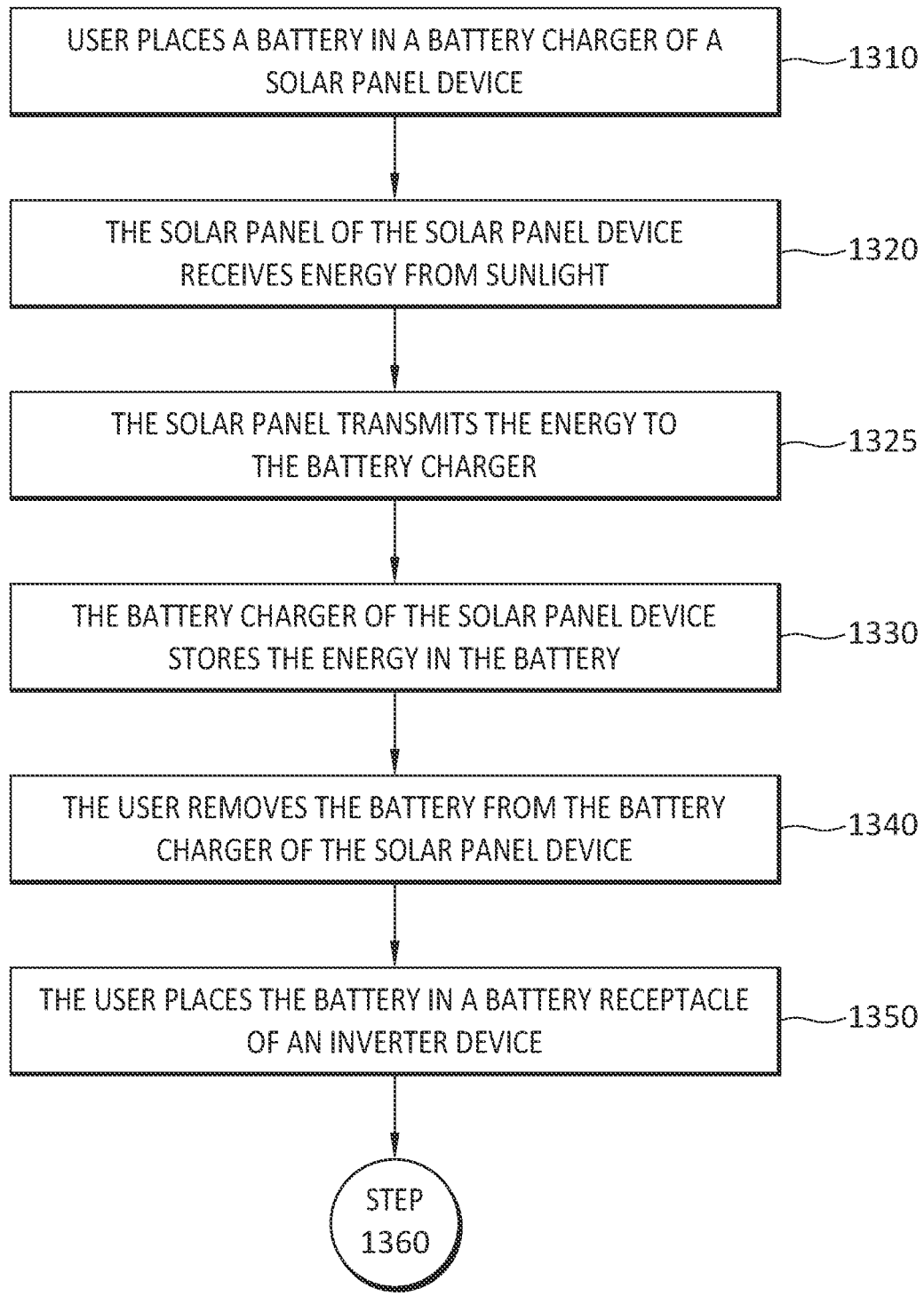
FIGS. 13A-13B show a method in accordance with an embodiment.
Figure 13B:
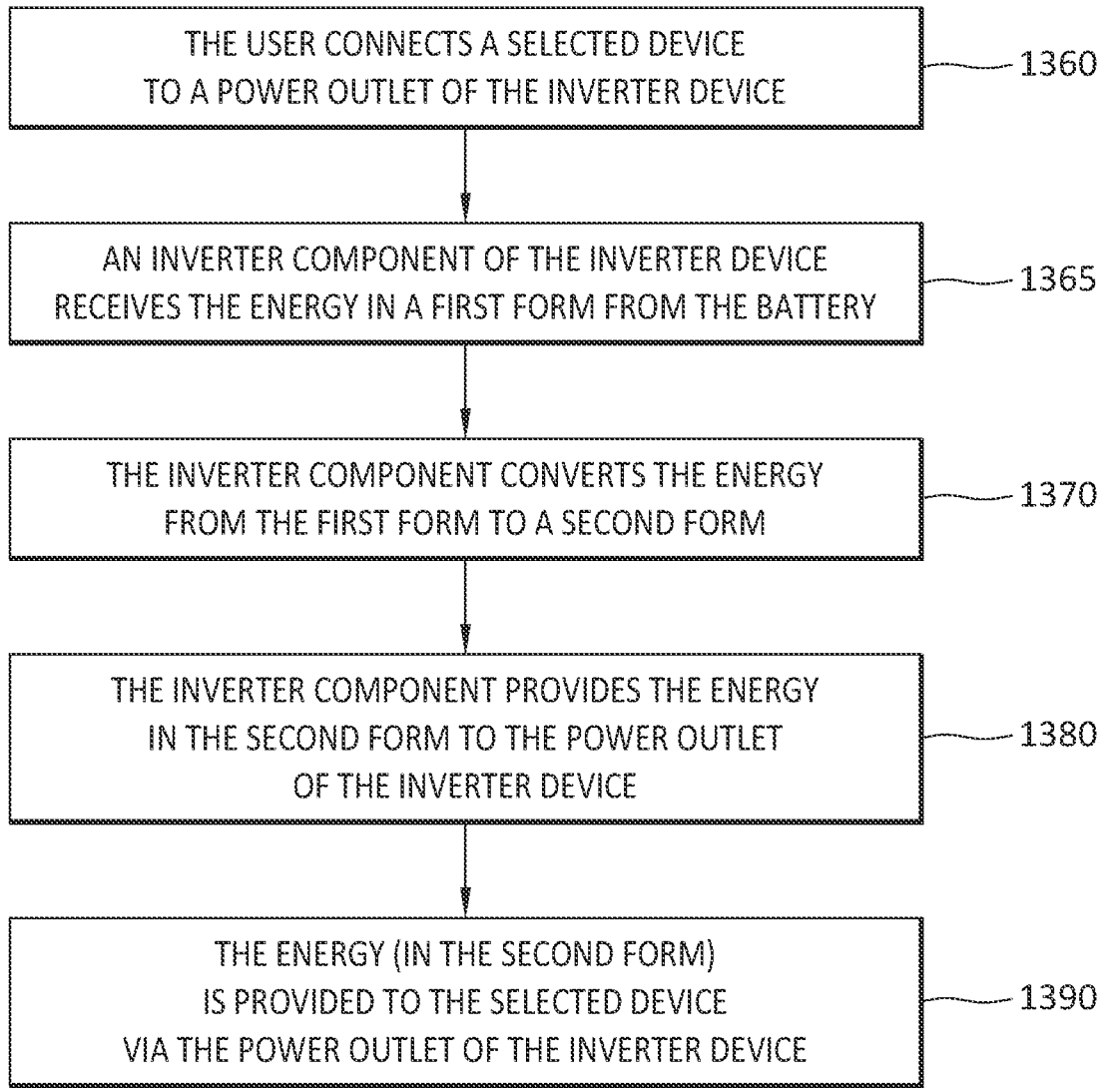

FIGS. 13A-13B show a method in accordance with an embodiment. The method of FIGS. 13A-13B is discussed below with reference to FIGS. 1-4.

In an illustrative embodiment, a user places solar panel device 110 in the user's yard, in a location that is exposed to sunlight. At step 1310, a user places a battery in a battery charger of a solar panel device. Thus, the user places rechargeable battery 125 into battery charger 115.

At step 1320, the solar panel of the solar panel device receives energy from sunlight. Solar panel 112 receives energy from sunlight.

At step 1325, the solar panel transmits the energy to the battery charger. Solar panel 112 transmits the energy to battery charger 115.

At step 1330, the battery charger of the solar panel device stores the energy in the battery. Battery charger 115 stores the energy in rechargeable battery 125.

At step 1340, the user removes the battery from the battery charger of the solar panel device. The user removes rechargeable battery 125 from battery charger 115.

In the illustrative embodiment, the user now carries rechargeable battery 125 into the user's house. The user has inverter device 160 in a selected room in the house.

At step 1350, the user places the battery in a battery receptacle of an inverter device. The user places rechargeable battery 125 into receptacle 168 of inverter device 160.

At step 1360, the user connects a selected device to a power outlet of the inverter device. Referring now to FIGS. 3-4, the user connects lamp 340 to power outlet 175 of inverter device 160. Power outlet 175 may be a standard 120-volt power outlet, for example. In the illustrative embodiment, lamp 340 has a plug adapted to connect to a 120-volt power outlet.

At step 1365, an inverter component of the inverter device receives the energy in a first form from the battery. An inverter component (similar to inverter component 1120 shown in FIG. 11) of inverter device 160 receives energy from rechargeable battery 125. In the illustrative embodiment, the inverter component of inverter device 160 receives energy from the rechargeable battery in the form of a direct current.

At step 1370, the inverter component converts the energy from the first form to a second form. The inverter component converts the direct current to an alternating current.

At step 1380, the inverter component provides the energy in the second form to the power outlet of the inverter device. The inverter component of inverter device 160 provides the alternating current to power outlet 175 of inverter device 160.

At step 1390, the energy (in the second form) is provided to the selected device via the power outlet of the inverter device. The alternating current is provided via power outlet 175 to lamp 340.

In accordance with another embodiment, a solar panel device may be mounted on a vertical surface. For example, a solar panel device may be mounted on a fence, a wall, a windowsill, or other similar structure. Preferably the solar panel device is mounted in a manner that ensures that the solar panel faces in a southerly direction (or other direction) to receive an optimal amount of sunlight.

Figure 14:
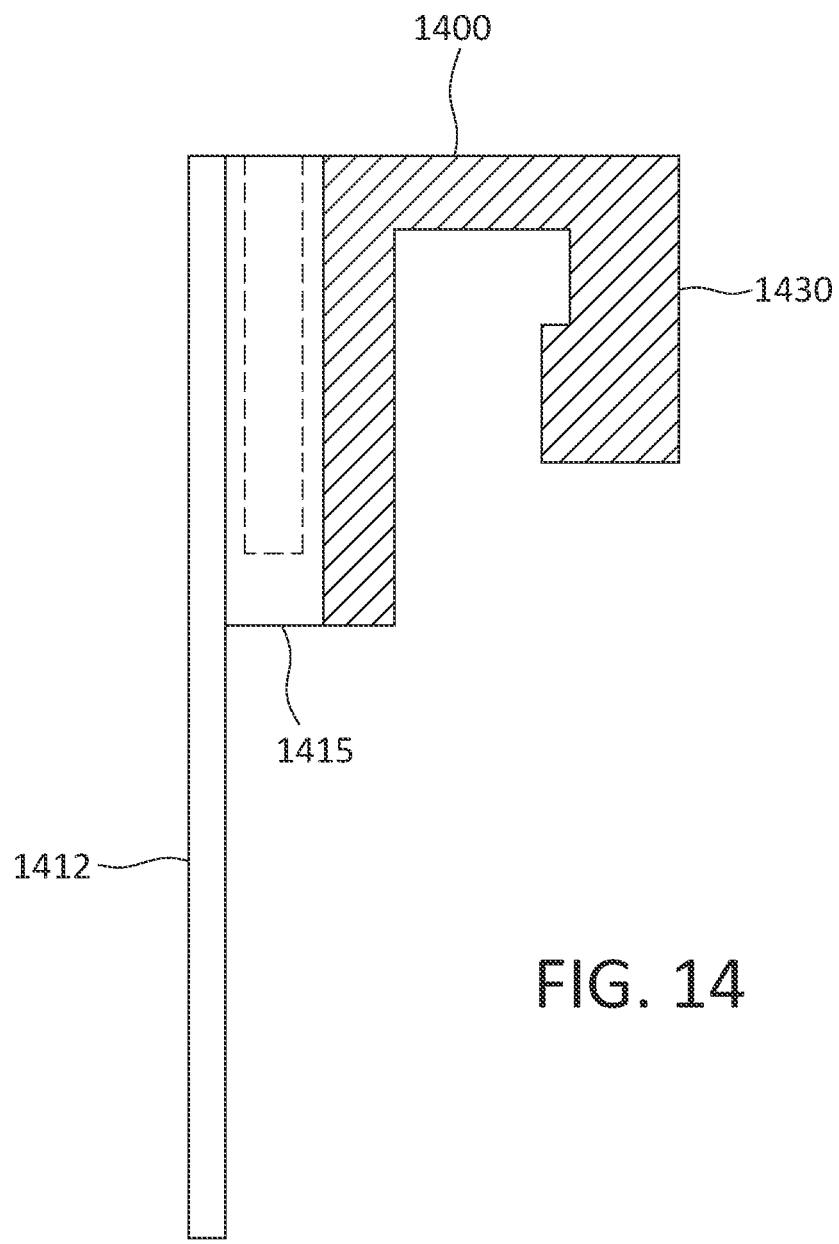
FIG. 14 shows a solar panel device in accordance with another embodiment.

FIG. 14 shows a solar panel device in accordance with an embodiment. Solar panel device 1400 includes a solar panel 1412, a battery charger 1415, and a mounting structure 1430. Solar panel 1412 is attached to battery charger 1415. Battery charger 1415 is attached to mounting structure 1430. Battery charger 1415 may include a cover (not shown in FIG. 14) or other mechanism to protect the battery receptacle and any battery disposed therein.

While FIG. 14 shows one arrangement of components of a solar panel device, in other embodiments, a solar panel device may be constructed in a manner different from that shown in FIG. 14.

In an illustrative embodiment, a user may employ solar panel device 1400 in conjunction with a rechargeable battery and an inverter unit such as inverter device 160 of FIG. 1.

Referring to FIG. 14, mounting structure 1430 is adapted to be placed over and to hang securely from the top of a vertical surface. For example, mounting structure 1430 may be placed over the top of a fence, over a wall, over a windowsill, etc.

Mounting structure 1430 may be formed of any suitable material. For example, mounting structure 1430 may comprise plastic, wood, metal, or another material.

Preferably, a user places solar panel device 1400 over the top of a fence, wall, or windowsill, in a manner that ensures that solar panel 1412 faces in a direction to optimize the amount of sunlight received. The user also inserts a battery into battery charger 1415. Once solar panel device 1400 is securely in place, solar panel 1412 receives light from the sun and generates an electrical voltage. The electrical voltage is used to charge the battery disposed in battery charger 1415, in the manner described herein. The user may subsequently retrieve the charged battery, place the charged battery in an inverter device, and power an appliance inside the user's home.

Figure 15:
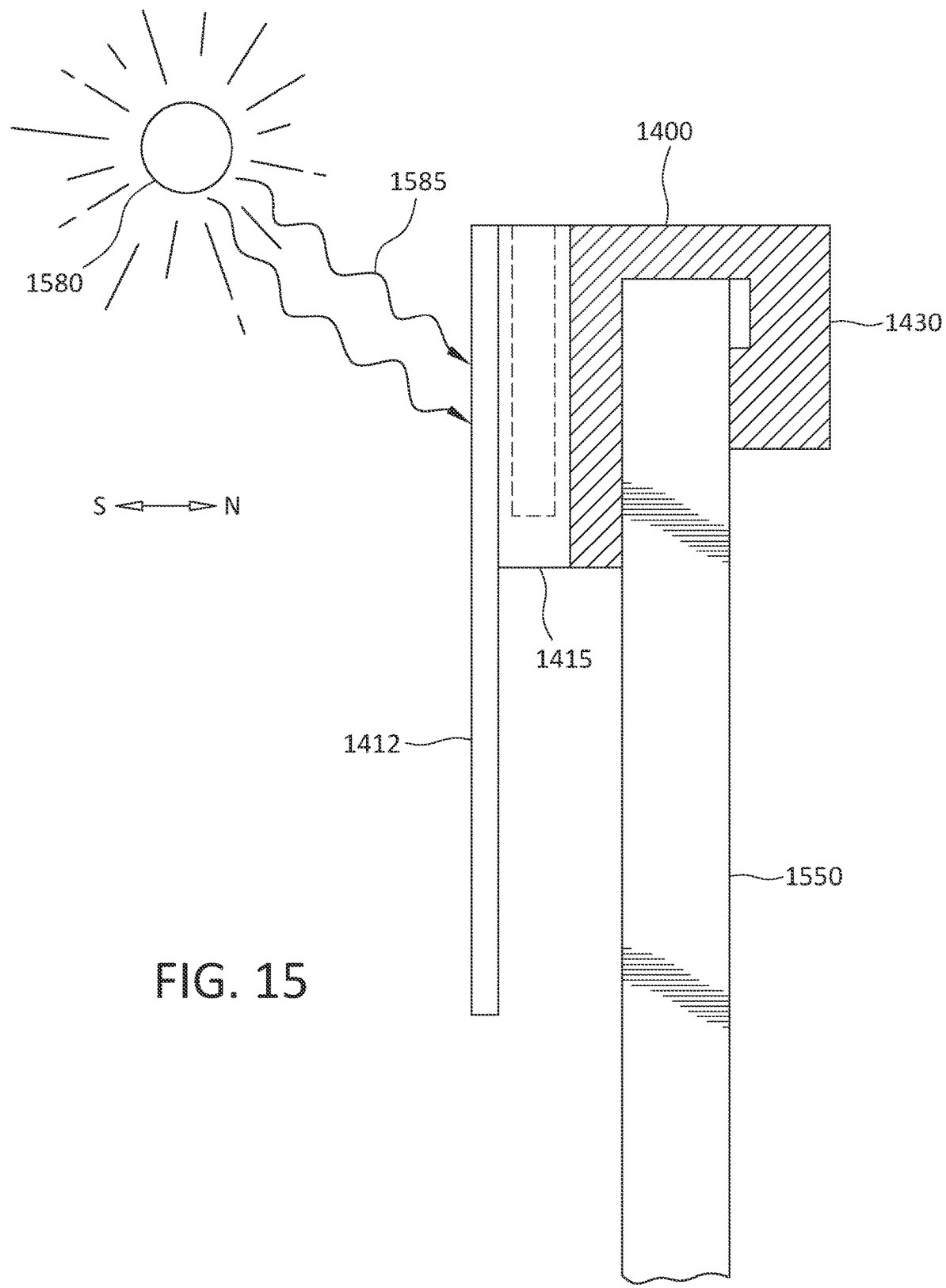
FIG. 15 shows a solar panel device disposed on a fence in accordance with an embodiment.

FIG. 15 shows a solar panel device disposed on a fence in accordance with an embodiment. In particular, solar panel device 1400 is disposed on a fence 1550. Mounting structure 1430 of solar panel device 1400 is secured on the top edge of fence 1550. In the illustrative embodiment, solar panel 1412 is placed on the south side of fence 1550 in order to maximize exposure to sunlight. Solar panel 1412 receives sunlight 1585 from sun 1580 and converts the sunlight into electrical energy. A user may insert a battery into battery charger 1415 of solar panel device 1400 in order to receive and store the energy.

Figure 16:
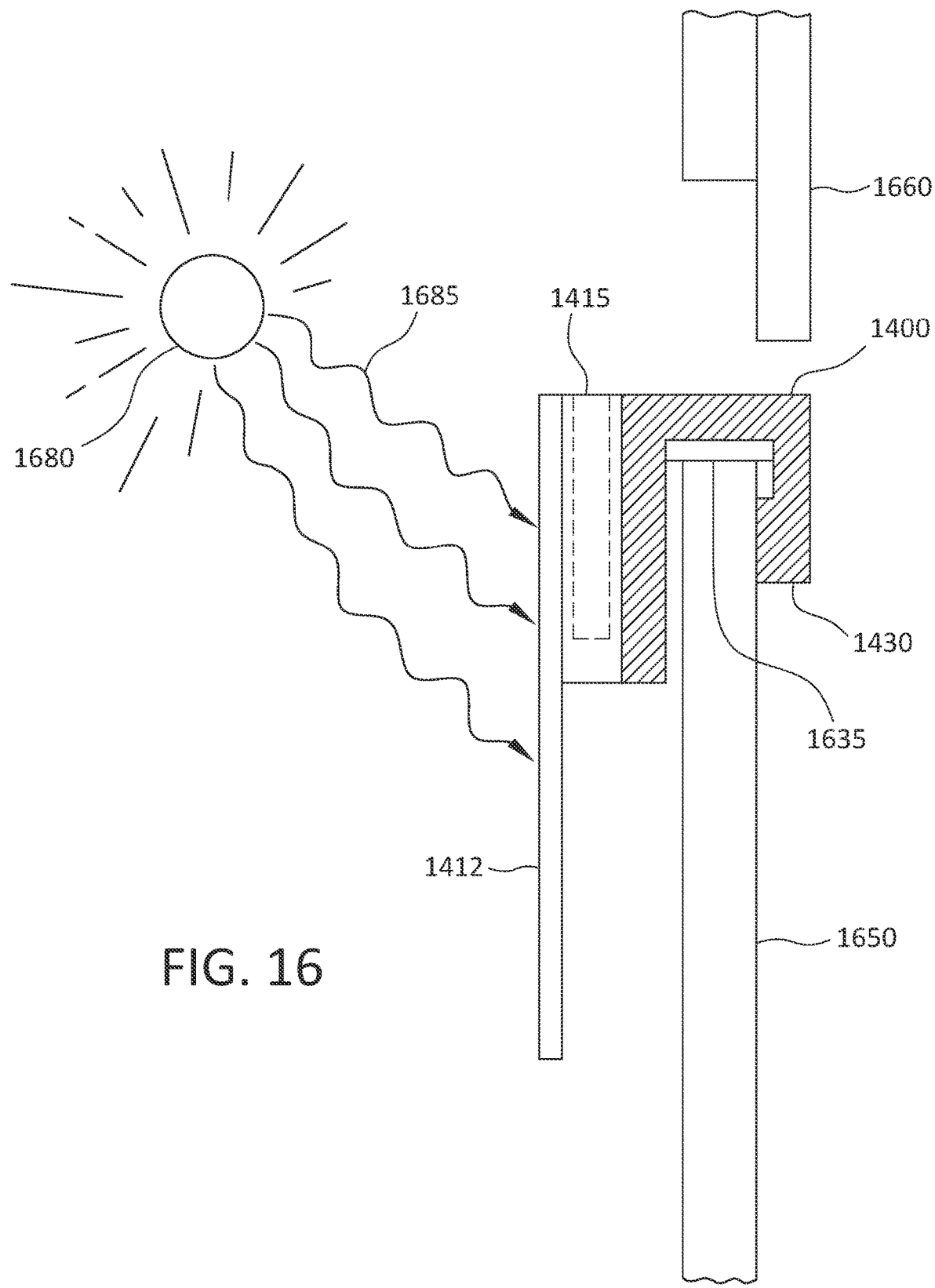
FIG. 16 shows a solar panel device disposed on a windowsill in accordance with an embodiment.

FIG. 16 shows a solar panel device disposed on a windowsill in accordance with an embodiment. In particular, FIG. 16 shows a window 1660 and a windowsill 1635 located in a wall 1650. Solar panel device 1400 is disposed on windowsill 1635. Mounting structure 1430 is secured on the top edge of windowsill 1635. In the illustrative embodiment, solar panel 1412 receives sunlight 1685 from sun 1680 and converts the sunlight into electrical energy. A user may insert a battery into battery charger 1415 in order to capture and store the energy.

Some users of a solar panel system as described herein may worry, after recharging the rechargeable battery, that another person may steal the battery and use it. In accordance with another embodiment, a solar panel system includes a solar panel device, a battery device, and an inverter device. The battery device contains a rechargeable battery and a recorded code. The inverter device includes a battery receptacle adapted to receive the battery device. The inverter device also includes a security system that allows the user to enter a code (on a keypad, for example). The inverter device is further adapted to retrieve the code stored in the battery device and compare the code retrieved from the battery device to the code entered by the user.

Thus, when a user inserts the battery device into the inverter device, the user must enter the correct code that matches the code stored in the battery device. The security system of the inverter device prevents the inverter device from accessing the rechargeable battery unless the user enters the correct code.

Figure 17:
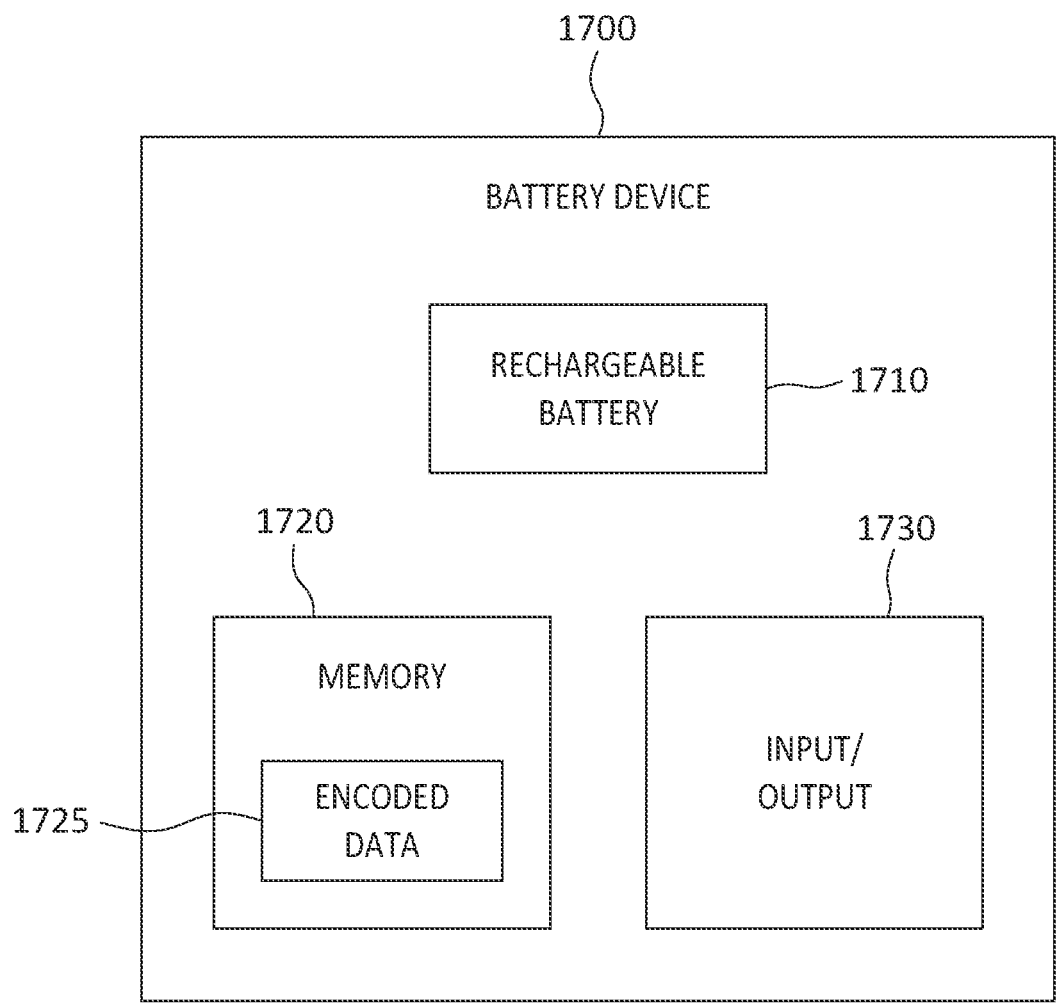
FIG. 17 shows components of a battery device in accordance with an embodiment.

FIG. 17 shows components of a battery device in accordance with an embodiment. Battery device 1700 includes a rechargeable battery 1710, a memory 1720, and an input/output device(s) 1730. Rechargeable battery 1710 is similar to battery 125 of FIG. 1. Memory 1720 stores data. Input/output device(s) 1730 are adapted to receive data and transmit data.

In the illustrative embodiment, memory 1720 of battery device 1700 stores encoded data 1725, which may include a code, for example.

Battery device 1700 is adapted to fit into battery recharger 115 of solar panel device 110. Thus, a user may insert battery device 1700 into battery recharger 115 and charge rechargeable battery 1710.

Figure 18:
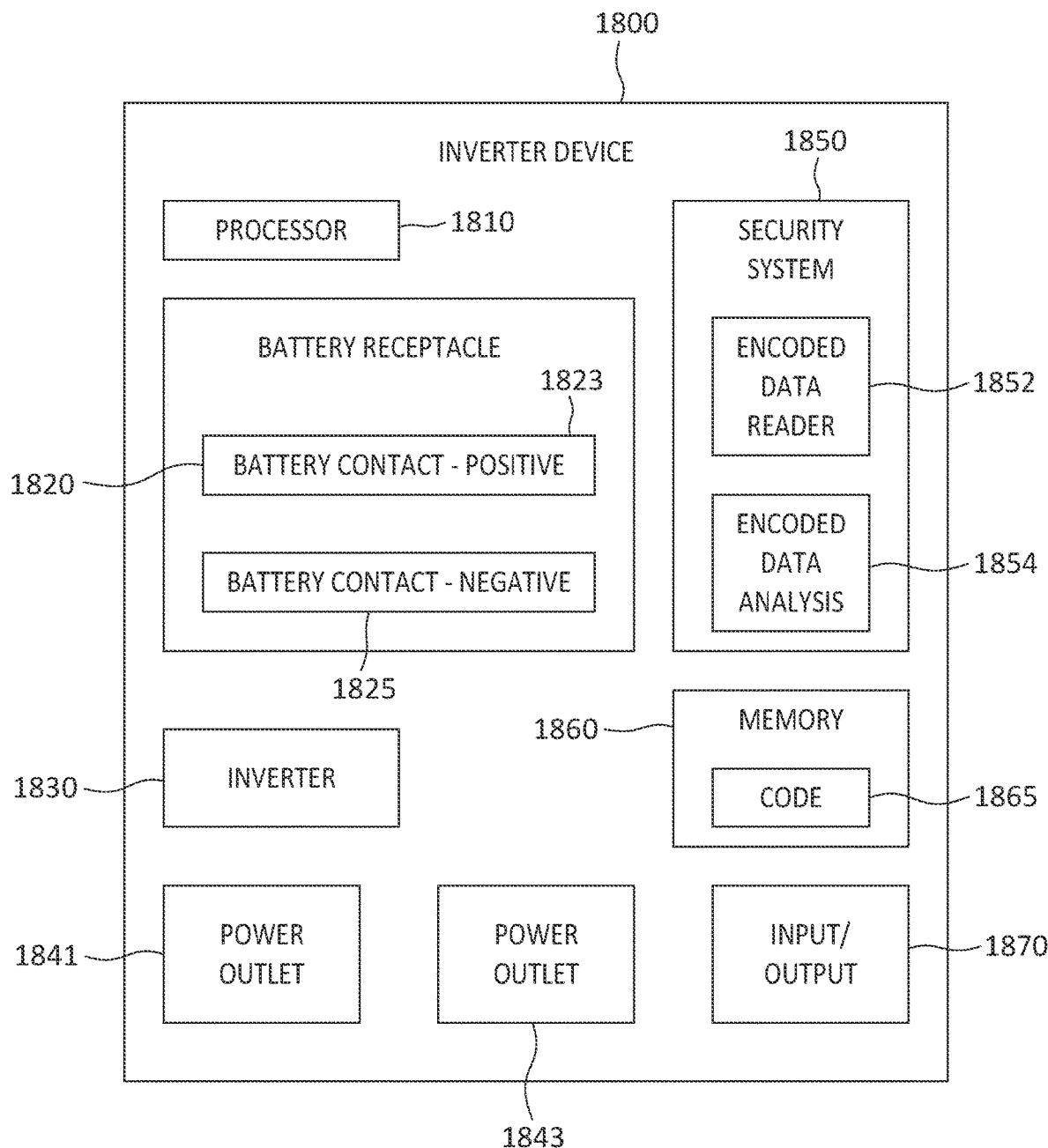
FIG. 18 shows components of an inverter device in accordance with an embodiment.

FIG. 18 shows components of an inverter device in accordance with an embodiment. Inverter device 1800 includes a processor 1810, a battery receptacle 1820, an inverter 1830, first and second power outlets 1841, 1843, a security system 1850, a memory 1860, and an input/output device 1870.

Processor 1810 controls the operations of various components of inverter device 1800. Processor 1810 may include software and/or hardware. For example, processor 1810 may include software and/or a central processing unit (CPU).

Battery receptacle 1820 includes a battery contact-positive 1823 and a battery contact-negative 1825. Battery receptacle 1820 is adapted to receive a battery device, such as battery device 1700. When terminals on the battery device contact battery contacts 1823 and 1825, a current is generated and provided to power outlet 1841 and/or power outlet 1843.

Inverter 1830 is adapted to receive energy from a battery device and to produce an electrical current via power outlet 1841 and/or power outlet 1943. Inverter 1830 may receive from the battery device energy in a first form, such as a direct current, and convert the energy to a second form, such as an alternating current, and provide the energy to a selected power outlet in the form of an alternating current.

Security system 1850 ensures that a user can access a battery device only if the user enters a code associated with the battery. Security system 1850 includes an encoded data reader 1852 and an encoded data analysis 1854. Encoded data reader 1852 is adapted to retrieve encoded data from a memory of a battery device. Encoded data analysis 1854 is adapted to decode the encoded data and extract a code.

Memory 1860 may be used to store data.

Input/output device 1870 may include, for example, a keypad that may be used by a user to enter alphanumeric characters. Input/output device 1870 may also include a display screen on which data and instructions may be displayed.

In an illustrative embodiment, a user may utilize a solar panel device such as solar panel device 110 (disposed in the user's yard, for example) in the manner described herein to charge the rechargeable battery 1710 of battery device 1700. The user may then retrieve battery device 1700 from the solar panel device, enter the user's home, and insert battery device 1700 into the battery receptacle 1820 of inverter device 1800.

In the illustrative embodiment, after the user inserts battery device 1700 into battery receptacle, encoded data reader 1852 accesses memory 1720 of battery device 1700 and retrieves encoded data 1725. Encoded data analysis 1854 decodes encoded data 1725 and extracts a code associated with battery device 1700.

Referring to FIG. 18, security system 1850 stores the code in memory 1860 as code 1865.

Inverter device 1800 may now prompt the user to enter a code. The user employs input/output device 1870 to enter a code which may include letters and/or numbers, for example. Security system 1850 compares the code entered by the user to the code 1865 stored in memory 1860. If the codes match, security system 1850 allows the user to access rechargeable battery 1710. If the codes do not match, security system 1850 prevents the user from accessing rechargeable battery 1710. For example, security system 1850 may prevent inverter 1830 from providing current to power outlets 1841, 1843.

If the user enters the correct code, then user may plug a selected appliance into power outlet 1841 or 1843 and receive an electrical current to power the appliance.

In accordance with another embodiment, a solar panel device includes a security system that stores a code. When the user wishes to use the solar panel device to charge a rechargeable battery, the user must enter a code that matches the stored code. If the user enters the correct code, then the solar panel device will be activated and operate for a predetermined period of time (for example, 12 hours). If the user is unable to enter the correct code, the solar panel device will be disabled (until the correct code is entered).

Figure 19:
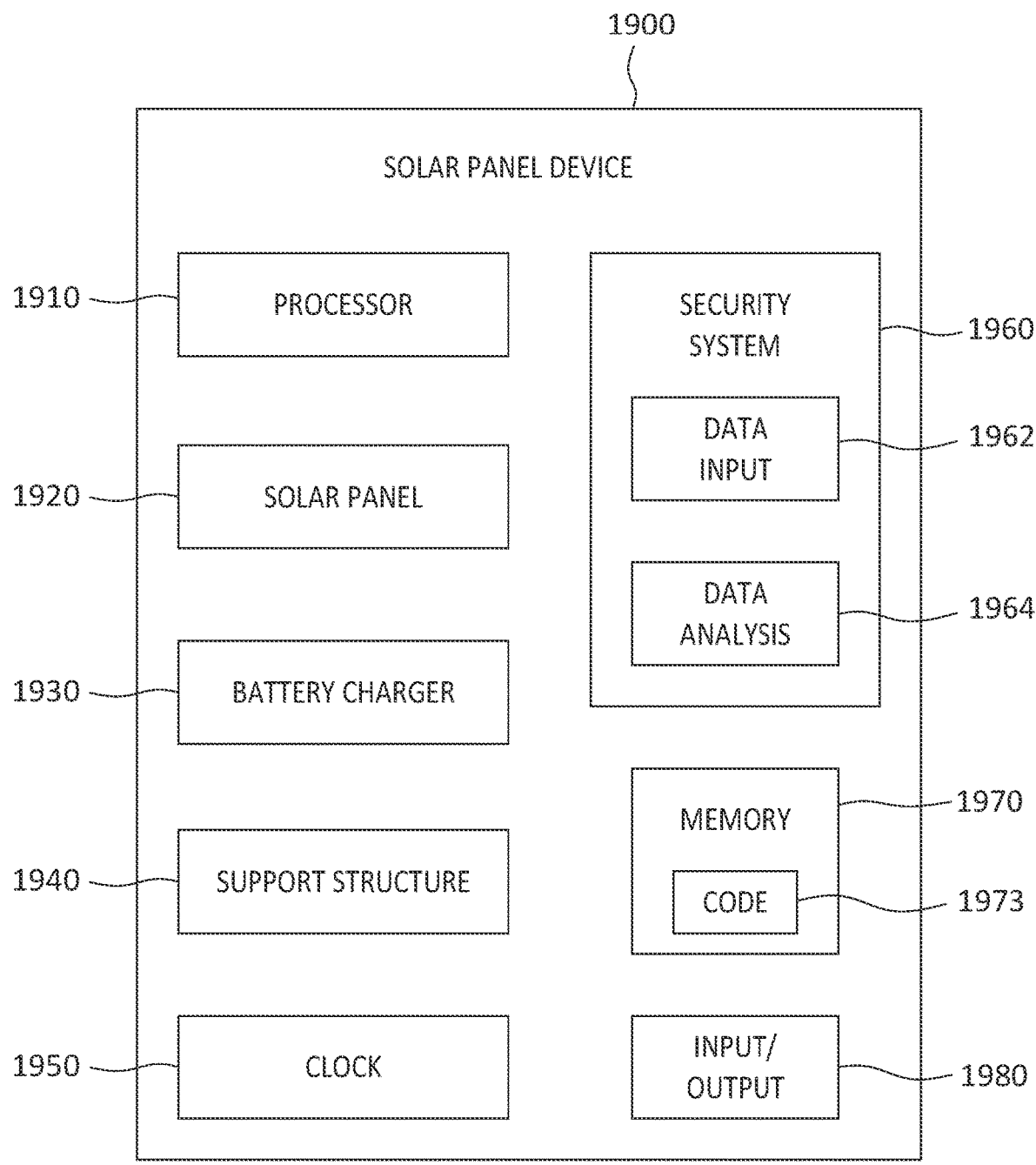
FIG. 19 shows components of a solar panel device in accordance with an embodiment.

FIG. 19 shows components of a solar panel device in accordance with an embodiment. Solar panel device 1900 includes a processor 1910, a solar panel 1920, a battery charger 1930, a support structure 1940, a clock 1950, a security system 1960, a memory 1970, and an input/output device 1980.

Processor 1910 controls the operations of other components of solar panel device 1900. Solar panel 1920 is similar to solar panel 112 of FIG. 1. Battery charger 1930 is similar to battery charger 115 of FIG. 1. Support structure 1940 may include a plurality of legs, a stand, a tripod, a column, or any other suitable structure adapted to support solar panel 1920 and battery charger 1930. Clock 1950 provides a measure of time. For example, clock 1950 may include a digital clock.

Memory 1970 is adapted to store data. In the illustrative embodiment, memory 1970 stores a code 1973. Code 1973 is a unique code associated with solar panel device 1900.

Input/output device 1980 may include, for example, a keypad that may be used by a user to enter alphanumeric characters. Input/output device 1980 may also include a display screen on which data and instructions may be displayed.

Security system 1960 ensures that a user can access battery charger 1930 only if the user enters a code associated with the solar panel device. Security system 1960 includes a data input 1962 and a data analysis 1964. Data input 1962 is adapted to receive a code entered by a user via input/output device 1980. Data analysis 1964 is adapted to compare the code entered by the user to code 1973 stored in memory 1970.

Thus, a user who wishes to use solar panel device 1900 to charge a battery must enter a code via input/output device 1980. Security system 1960 receives the code entered by the user and verifies that the code is valid by comparing it to code 1973 (stored in memory 1970). If the code entered by the user matches the stored code, security system 1960 allows the user to use battery charger 1930. If the codes do not match, security system 1960 prevents the user from using battery charger 1930, for example, by deactivating battery charger 1930.

In various embodiments, the method steps described herein, including the method steps described in FIG. 13A-13B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 13A-13B may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 20:
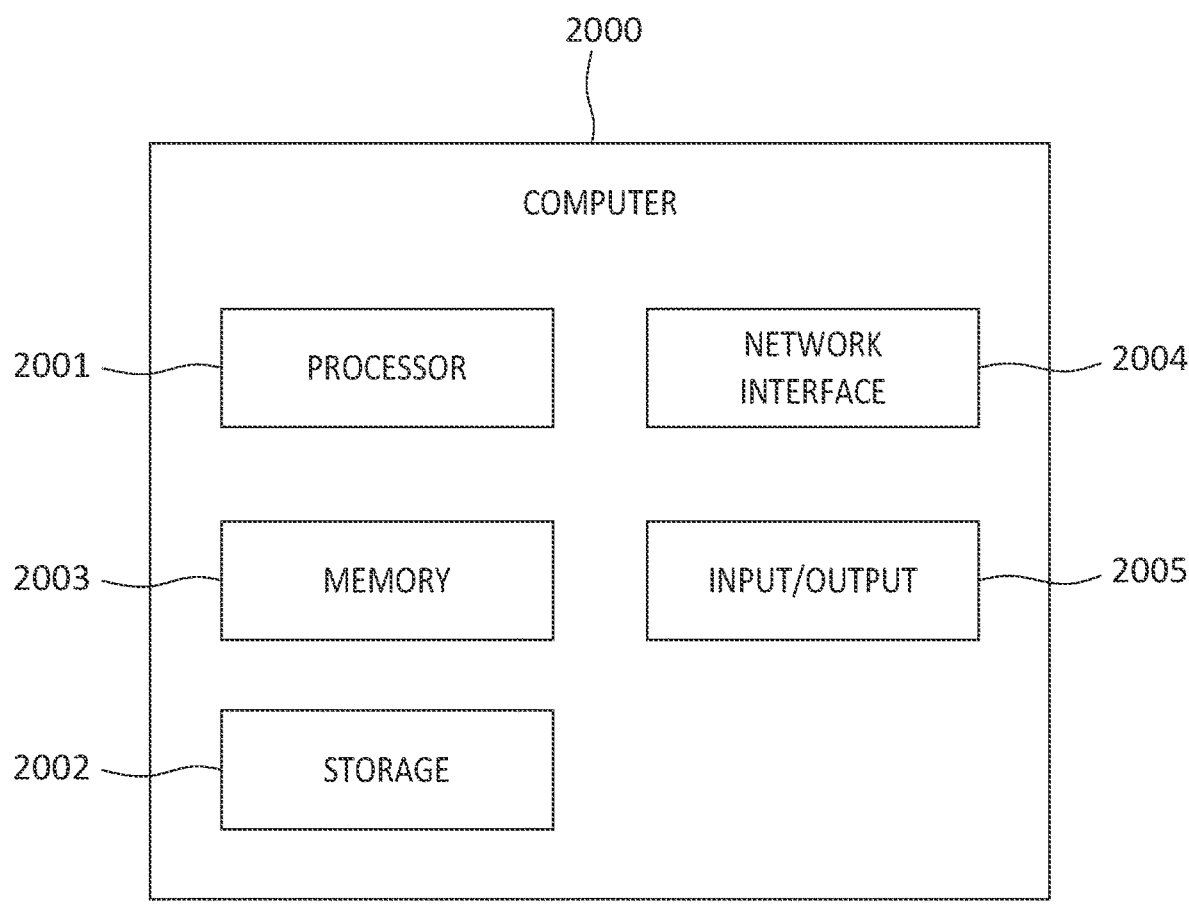
FIG. 20 shows components of an exemplary computer.

A high-level block diagram of an exemplary computer that may be used to implement systems, devices, apparatus and methods described herein is illustrated in FIG. 20. Computer 2000 includes a processor 2001 operatively coupled to a data storage device 2002 and a memory 2003. Processor 2001 controls the overall operation of computer 2000 by executing computer program instructions that define such operations. The computer program instructions may be stored in data storage device 2002, or other computer readable medium, and loaded into memory 2003 when execution of the computer program instructions is desired. Thus, some or all of the method steps of FIG. 13A-13B can be defined by the computer program instructions stored in memory 2003 and/or data storage device 2002 and controlled by the processor 2001 executing the computer program instructions. For example, the computer program instructions can be implemented as computer executable code programmed by one skilled in the art to perform an algorithm defined by the some or all of the method steps of FIG. 13A-13B. Accordingly, by executing the computer program instructions, the processor 2001 executes an algorithm defined by some or all of the method steps of FIG. 13A-13B. Computer 2000 also includes one or more network interfaces 2004 for communicating with other devices via a network. Computer 2000 also includes one or more input/output devices 2005 that enable user interaction with computer 2000 (e.g., display, keyboard, mouse, speakers, buttons, etc.).

Processor 2001 may include both general and special purpose microprocessors, and may be the sole processor or one of multiple processors of computer 2000. Processor 2001 may include one or more central processing units (CPUs), for example. Processor 2001, data storage device 2002, and/or memory 2003 may include, be supplemented by, or incorporated in, one or more application-specific integrated circuits (ASICs) and/or one or more field programmable gate arrays (FPGAs).

Data storage device 2002 and memory 2003 each include a tangible non-transitory computer readable storage medium. Data storage device 2002, and memory 2003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 2005 may include peripherals, such as a printer, scanner, display screen, etc. For example, input/output devices 2005 may include a display device such as a cathode ray tube (CRT) or liquid crystal display (LCD) monitor for displaying information to the user, a keyboard, and a pointing device such as a mouse or a trackball by which the user can provide input to computer 2000.

Any or all of the systems, devices, and apparatus discussed herein, including, for example, solar panel device 110, inverter device 1060, battery device 1700, inverter device 1800, and/or solar panel device 1900, and components thereof, may be implemented using a computer such as computer 2000.

One skilled in the art will recognize that an implementation of an actual computer or computer system may have other structures and may contain other components as well, and that FIG. 20 is a high-level representation of some of the components of such a computer for illustrative purposes.

Thus, in accordance with an embodiment, a system for utilizing renewable energy is provided. The system includes a rechargeable battery adapted to store energy, a solar panel device, and an inverter device. The solar panel device includes a solar panel adapted to receive sunlight and generate energy and a battery charger coupled to the solar panel. The battery charger is adapted to receive energy from the solar panel and store energy in the rechargeable battery. The inverter device includes a power outlet, and is adapted to receive energy from the rechargeable battery and produce an electric current via the power outlet.

In one embodiment, the solar panel includes a first surface comprising one or more photovoltaic cells and a second surface opposite the first surface. The battery charger is attached to the second surface.

In another embodiment, the battery charger includes a body having an external surface, an interior cavity within the body, the interior cavity adapted to hold at least a portion of the rechargeable battery, an opening in the external surface of the body, the opening adapted to allow the at least a portion of the rechargeable battery to be inserted into and removed from the interior cavity, and one or more connectors within the interior cavity, the connectors adapted to transfer energy into the rechargeable battery.

In another embodiment, the battery charger further includes a cover adapted to cover the opening. The cover has a closed position in which it covers the opening and an open position in which it does not cover the opening and allows the at least a portion of the rechargeable battery to be inserted into and removed from the interior cavity.

In another embodiment, the system includes a support structure coupled to the solar panel device, the support structure adapted to support the solar panel device in a selected position.

In another embodiment, the support structure includes a tripod or a plurality of legs.

In another embodiment, a central axis of the support structure passes through a center of gravity of the battery charger.

In another embodiment, the rechargeable battery is separate from the solar panel device and separate from the inverter device. The rechargeable battery is adapted to be manually inserted into and manually removed from the battery charger. The rechargeable battery is adapted to be manually inserted into and manually removed from the inverter device.

In another embodiment, the inverter device includes a body having an external surface, an interior cavity within the body, the interior cavity adapted to hold at least a portion of the rechargeable battery, an opening in the external surface of the body, the opening adapted to allow the at least a portion of the rechargeable battery to be inserted into and removed from the interior cavity, and one or more connectors within the interior cavity, the connectors adapted to receive energy from the rechargeable battery.

In another embodiment, the rechargeable battery further includes a memory storing a first code. The inverter device further includes a security system adapted to receive from a user a second code, determine whether the first code matches the second code, and allow the user to access the inverter device only if the first code matches the second code.

In another embodiment, the rechargeable battery further includes a memory storing a first code. The battery charger further includes a security system adapted to receive from a user a second code, determine whether the first code matches the second code, and allow the user to access the battery charger only if the first code matches the second code.

In accordance with another embodiment, a system includes a solar panel adapted to receive energy from sunlight, an inverter device having a power outlet adapted to provide an electric current, and a battery. The battery is adapted to be manually coupled to the solar panel, receive energy from the solar panel, store the energy, be manually decoupled from the solar panel, be manually coupled to the inverter device, and provide the energy to the inverter device.

In one embodiment, the system also includes a battery charger coupled to the solar panel. The battery charger is adapted to connect to the battery and provide energy to the battery.

In another embodiment, the solar panel and battery charger are coupled to a support structure adapted to hold solar panel in a desired position.

In another embodiment, the inverter device further includes a receptacle adapted to receive the battery, a connector device adapted to connect to the battery and receive energy from the battery, and a device adapted to convert the energy received from the battery from a first form to a second form that can be provided via the power outlet.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A system comprising:
a rechargeable battery adapted to store energy;
a solar panel device comprising:
 a solar panel element adapted to receive sunlight and generate energy; and
 a battery charger coupled to the solar panel element, the battery charger comprising, while in a fully assembled and operative condition, a first body including an external surface having a first opening, and a first receptacle accessible via the first opening, the battery charger adapted to:
 receive energy from the solar panel element;
 receive at least a first portion of the rechargeable battery via the first opening and retain at least the first portion of the rechargeable battery in the first receptacle;
 connect electrically to the rechargeable battery;
 store energy in the rechargeable battery; and
 disconnect electrically from the rechargeable battery; and
an inverter device permanently and at all times separate from, independent of, and disconnected from the solar panel device, and adapted to being located remotely from the solar panel device, the inverter device comprising, while in a fully assembled and operative condition, a second body different from the first body, the second body including a second surface including a second opening, a second receptacle accessible via the second opening, and a power outlet, the inverter device further adapted to:

receive at least a second portion of the rechargeable battery via the second opening and retain at least the second portion of the rechargeable battery in the second receptacle;
connect electrically to the rechargeable battery;
receive energy from the rechargeable battery;
produce an electric current via the power outlet; and
disconnect electrically from the rechargeable battery;
wherein:
the system has a first state in which at least the first portion of the rechargeable battery is disposed in the first receptacle of the battery charger, and the rechargeable battery is coupled to the battery charger and decoupled from the inverter device; and
the system has a second state in which at least the second portion of the rechargeable battery is disposed in the second receptacle of the inverter device, and the rechargeable battery is coupled to the inverter device and decoupled from the battery charger.

2. The system of claim 1,
wherein:
the solar panel device comprises:
a first side and a second side opposite the first side; and
one or more photovoltaic cells disposed on the first side of the solar panel device;
the system further comprising:
a support structure disposed on the second side of the solar panel device, the support structure adapted to support at least the solar panel device;
wherein
the battery charger is disposed between the support structure and the solar panel device.

3. The system of claim 1, wherein:
the first body of the battery charger further comprises an external surface;
the first receptacle is located within the first body; and
the first receptacle comprises a cavity adapted to hold at least the first portion of the rechargeable battery, wherein the first opening is located in the external surface of the first body, the first opening adapted to allow the at least the first portion of the rechargeable battery to be inserted into and removed from the cavity; and
one or more connectors within the cavity, the one or more connectors adapted to transfer energy into the rechargeable battery.

4. The system of claim 3, wherein the battery charger further comprises:
a cover adapted to cover the opening;
wherein the cover has a closed position in which the cover covers the opening and an open position in which the cover does not cover the opening and allows the at least the first portion of the rechargeable battery to be inserted into and removed from the cavity.

5. The system of claim 1, further comprising:
a support structure coupled to the solar panel device, the support structure adapted to support the solar panel device in a selected position.

6. The system of claim 5, wherein the support structure includes one of a tripod and a plurality of legs.

7. The system of claim 5, wherein a central axis of the support structure passes through a center of gravity of the battery charger.

8. The system of claim 1, wherein:
the rechargeable battery is separate from the solar panel device and separate from the inverter device;
the rechargeable battery is adapted to be manually inserted into and manually removed from the battery charger; and
the rechargeable battery is adapted to be manually inserted into and manually removed from the inverter device.

9. The system of claim 3, wherein the inverter device comprises:
a second body having a second external surface, the second receptacle being located within the second body, the second receptacle comprising a second cavity adapted to hold at least the second portion of the rechargeable battery, wherein the second opening is located in the second external surface of the second body, the second opening adapted to allow at least the second portion of the rechargeable battery to be inserted into and removed from the second cavity; and
one or more second connectors within the second cavity, the one or more second connectors adapted to receive energy from the rechargeable battery.

10. The system of claim 1, wherein:
the rechargeable battery further comprises a memory storing a first code;
the inverter device further comprises:
a security system adapted to:
receive from a user a second code;
determine whether the first code matches the second code; and
allow the user to access the inverter device only if the first code matches the second code.

11. The system of claim 1, wherein:
the rechargeable battery further comprises a memory storing a first code;
the battery charger further comprises:
a security system adapted to:
receive from a user a second code;
determine whether the first code matches the second code; and
allow the user to access the battery charger only if the first code matches the second code.

12. A system comprising:
a solar panel device comprising:
a solar panel adapted to receive energy from sunlight; and
a battery charger coupled to the solar panel, the battery charger comprising, while in a fully assembled and operative condition, a first body including a first external surface having a first opening, and a first receptacle accessible via the first opening, one or more connectors disposed in the receptacle, the battery charger adapted to:
receive energy from the solar panel; and
discharge energy via the one or more connectors;
an inverter device permanently and at all times separate from, independent of, and disconnected from the solar panel device, and adapted to being located remotely from the solar panel device, the inverter device comprising, while in a fully assembled and operative condition, a body including a second external surface including a second opening, a second receptacle accessible via the second opening, and a power outlet adapted to provide an electric current; and
a battery adapted to:
be manually coupled to the battery charger of the solar panel device by manual insertion of at least a first portion of the battery into the first receptacle of the battery charger via the first opening;

receive energy from the battery charger of the solar panel device;
store the energy;
be manually decoupled from the battery charger of the solar panel device;
be manually coupled to the inverter device by manual insertion of at least a second portion of the battery into the second receptacle of the inverter device via the second opening; and
provide the energy to the inverter device;

wherein:
the system has a first state in which the battery is coupled to the solar panel and decoupled from the inverter device; and
the system has a second state in which the battery is coupled to the inverter device and decoupled from the solar panel.

13. The system of claim 12, wherein the solar panel and battery charger are coupled to a support structure adapted to hold the solar panel in a desired position.

14. The system of claim 12, wherein the inverter device further comprises:
a device adapted to convert the energy received from the battery from a first form to a second form that can be provided via the power outlet.

* * * * *